United States Patent
Du

(10) Patent No.: US 11,555,573 B2
(45) Date of Patent: Jan. 17, 2023

(54) COMPUTATIONAL RISK MODELING SYSTEM AND METHOD FOR PIPELINE OPERATION AND INTEGRITY MANAGEMENT

(71) Applicant: Shuyong Paul Du, Plano, TX (US)

(72) Inventor: Shuyong Paul Du, Plano, TX (US)

( * ) Notice: Subject to any disclaimer, the term of this patent is extended or adjusted under 35 U.S.C. 154(b) by 0 days.

(21) Appl. No.: 17/486,590

(22) Filed: Sep. 27, 2021

(65) Prior Publication Data

US 2022/0010914 A1 Jan. 13, 2022

Related U.S. Application Data

(63) Continuation of application No. 16/798,229, filed on Feb. 21, 2020, now Pat. No. 11,131,419, which is a continuation-in-part of application No. PCT/US2019/025438, filed on Apr. 2, 2019.

(60) Provisional application No. 62/809,115, filed on Feb. 22, 2019, provisional application No. 62/651,520, filed on Apr. 2, 2018.

(51) Int. Cl.
*F16L 55/26* (2006.01)
*G01N 21/85* (2006.01)
*G06Q 10/06* (2012.01)
*F16L 101/30* (2006.01)

(52) U.S. Cl.
CPC .......... *F16L 55/26* (2013.01); *G06Q 10/0635* (2013.01); *F16L 2101/30* (2013.01); *G01N 21/85* (2013.01)

(58) Field of Classification Search
USPC ............................................ 73/49.1; 348/85
See application file for complete search history.

(56) References Cited

U.S. PATENT DOCUMENTS

| | | | |
|---|---|---|---|
| 9,863,891 B1 * | 1/2018 | Lara Magallanes | ......................... G01N 21/952 |
| 2006/0129338 A1 * | 6/2006 | Turley | ..................... F17D 5/00 702/51 |
| 2015/0019266 A1 | 1/2015 | Stempora | |

OTHER PUBLICATIONS

Pipeline and Hazardous Materials Safety Administration. "Pipeline Risk Modeling Overview of Methods and Tools for Improved Implementation." Draft 1 (May 9, 2018).
A Report To the Secretary of Transportation: Pipeline Integrity Management. "An Evaluation to Help Improve PHMSA's Oversight of Performance-Based Pipeline Safety Programs." (Oct. 31, 2013).
Khaleghi et al. "Fuzzy Risk Assessment and Management in Process Industries-Case Study: Gas Pipelines" American Journal of Oil and Chemical Technologies; ISSN (online): 2326-6589; ISSN (print): 2326-6570 vol. 2, Issue 5 (May 2014).

(Continued)

*Primary Examiner* — Mikhail Itskovich
(74) *Attorney, Agent, or Firm* — Loza & Loza, LLP; Jessica Smith

(57) ABSTRACT

A system for operation and integrity management of a pipeline stores field data obtained from an operational system, and in-line data obtained from an in-line inspection vehicle and external data from a video camera on an external companion device. The system performs data processing on the in-line data and field data to generate input for risk modeling and performs risk modeling of the pipeline using the input to predict a risk of one of a plurality of failure mode states at a portion of the pipeline. The system may initiate risk monitoring for the portion of the pipeline by the operational system and the in-line inspection vehicle.

20 Claims, 13 Drawing Sheets

(56) References Cited

OTHER PUBLICATIONS

ASME B31.8S-2004. "Managing system integrity of gas pipelines." ASME Code for Pressure Piping, 831 Supplement to ASME 831.8.
Hendren et al. "L3—Quantitative Risk Reference Model For Pipelines." American Innovations Integrity Management Division (Aug. 2008).
Muhlbauer, "Pipeline Risk Management Manual: Ideas, Techniques, and Resources." (2004).
Process Performance Improvement Consultants, LLC. "Comparison of integrity management assessment techniques for natural gas transmission pipelines." The Ingaa Foundation, Inc. (2007).
Trench et al. "The role of energy pipelines and research in the united states—Sustaining the Viability and Productivity of a National Asset." Pipeline Research Council International, Inc. (2006).
Koduru. et al. "Critical Review of Candidate Pipeline Risk Models, Final Report." C-FER Technologies (Dec. 2016).
Lam. "Statistical Analyses of Historical Pipeline Incident Data with Application to the Risk Assessment of Onshore Natural Gas Transmission Pipelines."
Otterness. "Turing Machines COMP 455-02: Models of Languages and Computation." https://www.cs.unc.edu/~otternes/comp455/8 (Spring 2019).
Zeigler. "DEVS and SES as a Framework for Modeling and Simulation Tool Development." Presented at SIMUTools, Marseille, France (Mar. 3-7, 2008).
Alshareef et al. "DEVS specification for modeling and simulation of the UML activities." Mod4Sim '17 Proceedings of the Symposium on Model-driven Approaches for Simulation Engineering, Article No. 9 pp. 1-12 (Apr. 2017).
Nahal et al. "Failure Probability Assessment for Pipelines under the Corrosion Effect." American Journal of Mechanical Engineering, vol. 2, No. 1:15-20 (2014).
Shuai et al. "Assessment method for failure probability of corroded pipeline." Acta Petrolei Sinica, vol. 24, No. 4 (Jul. 2003).
Kiefner et al. "Periodic Hydrostatic Testing or In-line Inspection to Prevent Failures from Pressure-Cycle-Induced Fatigue." Paper Presented at API's 51st Annual Pipeline Conference and Cybernetics Symposium, New Orleans, Louisiana (Apr. 18-20, 2000).
Larrosa et al. "Corrosion-fatigue: a review of damage tolerance models." International Materials Reviews, DOI: 10.1080/09506608.2017.1375644 (2017).
Velazquez et al. "Probabilistic Analysis of Different Methods Used to Compute the Failure Pressure of Corroded Steel Pipelines." International Journal of Electrochemical Science, 8:11356-11370 (2013).
Senouci et al. "A model for predicting failure of oil pipelines". Structure and Infrastructure Engineering 10:3, 375-387, DOI: 10.1080/15732479.2012.756918 (2014).
Layouni et al. "A survey on the application of Neural Networks in the safety assessment of oil and gas pipelines". IEEE Symposium on Computational Intelligence for Engineering Solutions (CIES), Orlando, FL,, pp. 95-102. doi: 10.1109/CIES.2014.7011837 (2014).
Pedronia et al. "Comparison of bootstrapped artificial neural networks and quadratic response surfaces for the estimation of the functional failure probability of a thermal-hydraulic passive system". Reliability Engineering & System Safety, vol. 95, Issue 4, pp. 386-395 (Apr. 2010).
Ogai et al. "Pipe inspection robots for structural health and condition monitoring." New Delhi: Spring (2018).

\* cited by examiner

COMPUTATIONAL RISK MODELING SYSTEM AND METHOD FOR PIPELINE OPERATION AND INTEGRITY MANAGEMENT

CROSS REFERENCE TO RELATED APPLICATIONS

The present application claims priority under 35 U.S.C. § 120 as a continuation application to U.S. application Ser. No. 16/798,229 entitled, "COMPUTATIONAL RISK MODELING SYSTEM AND METHOD FOR PIPELINE OPERATION AND INTEGRITY MANAGEMENT," filed on Feb. 21, 2020 and issuing as U.S. patent Ser. No. 11/131,419 on Feb. 28, 2021 (the '419 patent), which is hereby expressly incorporated by reference herein.

The '419 patent claims priority under 35 U.S.C. § 119 to U.S. Provisional Application No. 62/809,115 entitled, "COMPUTATIONAL RISK MODELING SYSTEM AND METHOD FOR PIPELINES," filed Feb. 22, 2019, which is hereby expressly incorporated by reference herein.

The '419 patent claims priority under 35 U.S.C. § 120 as a continuation in part application to PCT Application No. PCT/US2019/025438 entitled "INTELLIGENT DATA ACQUISITION SYSTEM AND METHOD FOR PIPELINES" filed Apr. 2, 2019, which is hereby expressly incorporated by reference herein, which claims priority under 35 U.S.C. § 119 to U.S. Provisional Application No. 62/651,520 entitled, "INTELLIGENT DATA ACQUISITION SYSTEM AND METHOD FOR PIPELINES," filed Apr. 2, 2018, which is hereby expressly incorporated by reference herein.

FIELD

This application relates to operation of a pipeline and a system and method for risk management of the pipeline.

BACKGROUND

Long distance pipelines transport products between cities, countries and even continents. A pipeline network is widespread, running alternately through remote and densely populated regions. Nearly three million miles of pipeline transporting natural gas, oil, refined products and other hazardous liquids crisscross the United States, and pipelines transport nearly two-thirds of country's energy supply and convey flammable or explosive materials. Therefore, improving pipelines' safety and security is so critical for not only securing "the Veins of the American Economy" but also eliminating any potential risk for public injury, destruction of property, and environmental damage.

Pipeline risk models are a foundational part of the assessment of operational pipeline risk. Risk models are the heart of an operator's risk management system. Pipeline risk models and the results they produce are at the core of many pipeline integrity programs, both in the US and internationally. A risk model is a simplified representation of a pipeline system and represents the relation of important risk factors, a set of algorithms or rules that use available information and data relationships to perform risk assessment.

The pipeline industry had begun to apply risk modeling to support risk assessment and decision in planning maintenance and capital projects as early as the mid-1980s and worked to develop industry standards and recommended practices such as API Recommended Practice (RP) 1160—Managing System Integrity for Hazardous Liquid Pipelines, and ASME B31.8S—Managing System Integrity of Gas Pipelines.

Federal pipeline safety integrity management (IM) regulations require pipeline operators to use risk assessments. The risk model should support risk analysis, risk management decisions, and help operators evaluate and quantify the effects of various risk mitigation activities and options.

However, based on the results of pipeline inspections and failure investigation findings, both the Department of Transportation's Pipeline and Hazardous Materials Safety Administration (PHMSA) and the National Transportation Safety Board (NTSB) have identified general weaknesses in the risk models used by pipeline operators in performing risk assessments for their IM programs.

Operators should select the best model approach and then populate the model with the best information available on risk factors or threats for each pipeline segment and improve that data over time.

Currently, more than 90 applied methodologies of risk assessment have been developed. Risk models employed in pipeline risk analysis can be categorized based on the nature of the model's inputs, outputs, and the nature of the algorithms used to convert the inputs to outputs. Below gives the breakdown of risk model categories:

The Qualitative model
The Relative Assessment or Index model
The Quantitative System model
The Probabilistic model Based on a definition by Pipeline and Hazardous Materials Safety Administration, a risk model provides a representation of the risks throughout a pipeline system by combining inputs associated with both likelihood and consequence aspects of unintended pipeline releases. The conceptual definition of risk used to structure risk assessment is given by the equation:

$$Risk = Likelihood \times Consequence$$

Risk is defined as a measure of potential loss in terms of both the likelihood (or frequency of occurrence) of an event and the magnitude of the consequences from the event.

For hazardous liquid and natural gas pipeline systems, the basic undesired event is the failure of any segment of a pipeline or pipeline system that results in a release of the gas or hazardous liquid. Likelihood is the probability or frequency of failure due to threats that affect the pipeline, and consequence is the severity of impacts to different receptor categories (e.g., human safety, environment, property) because of a pipeline failure.

A risk analysis considers the likelihood of failure from all potential and existing threats at each segment along the pipeline. So, the risk modeling and analysis should include three key elements:
1. Identify the threats;
2. Determine the probability of failure due to threats;
3. Evaluate the consequence because of a pipeline failure.

Obviously, identifying the threats is the corner stone and foundation for risk modeling.

However, based on the data from Rick Kowalewski's report on "Program Evaluation: Pipeline Integrity Management," (Oct. 31, 2013), there are 1355 significant accidents of hazardous liquid pipelines from 2002 to 2012, among them, 824 incidents were caused by corrosions and material failures, count about 60%. The rest—40% incidents were caused by excavation damages, human errors, natural forces and others. Among the 821 significant accidents of gas transmission pipelines from 2002 to 2012, there were 420 incidents that were caused by corrosions and material failures, count about 51%. The rest—49% of the incidents were caused by excavation damages, human errors, natural forces and others.

If we consider "corrosion and material failure" as time-dependent threats, there are still about 40-50% significant accidents caused by time-independent risk factors. In another words, the out force damages, human casualties, economic and environmental adverse effects all bring uncertainty and ambiguity for the failures of pipelines. So, we need enough data, complete data, accurate data and on-time data to identify the threats, and find a mechanism to deal with unknown, or uncertainty of the risk factors causing pipeline's failure.

Therefore, a system approach should include a thoroughly considered, more effective, and more efficient means of inspecting pipeline systems. In addition, inspection methods need to be innovated. Then, a new system-wide solution or well-designed framework based on technical innovations and data integrations may overcome the challenges from insufficient or uncertain data in the problems of real world pipelines, so that the issues with risk ambiguity and uncertainty may be solved.

SUMMARY

In one aspect, a system for operation and integrity management of a pipeline includes at least one memory device including a non-transitory memory for storing field data obtained from an operational system and in-line data obtained from an in-line inspection vehicle. The system includes at least one processing device configured to perform data processing on the in-line data and field data to generate input for risk modeling; perform risk modeling of the pipeline using the input to predict a risk of one of a plurality of failure mode states at a portion of the pipeline; and initiate risk monitoring for the portion of the pipeline by the operational system and the in-line inspection vehicle.

In another aspect, a system for operation and integrity management of a pipeline stores in at least one memory device in-line data obtained from an in-line inspection vehicle and external data from a video camera on an external companion device. The system also includes at least one processing device configured to: generate a set of input values using the field data obtained from the operational system, the in-line data obtained from the in-line inspection vehicle and the external data from the video camera on the external companion device; process the set of input values using a risk modeling analysis to generate an output including a predication of one of a plurality of failure mode states of a portion of the pipeline; and initiate risk monitoring for the portion of the pipeline by the operational system, the in-line inspection vehicle, and the companion device.

In one or more of the above aspects, the plurality of failure mode states includes seepage, small leak, large leak, rupture and puncture.

In one or more of the above aspects, the at least one processing device is configured to perform the risk modeling of the pipeline by processing the input using a Cluster Machine that defines a plurality of sets of transition functions, wherein the plurality of sets of transition functions include a set of internal transition functions having at least three subsets of functions of corrosion based transition functions, stress based transition functions, and pressure-defect based transition functions.

In one or more of the above aspects, the Cluster Machine further defines a plurality of clusters of events, wherein the plurality of clusters of events includes at least: a cluster of operation related risk events; a cluster of random risk events; and a cluster of time dependent risk events.

In one or more of the above aspects, the Cluster Machine M is defined as M=<X, S, Y, $\delta i$, $\delta e$, $\delta c$, $\lambda$, T, O, R, ta>, wherein X is a set of input values, S is a set of states, Y is a set of output values, $\delta i$ is the set of internal transition functions, $\delta e$ is a set of external transition functions, $\delta c$ is the set of confluent transition functions, T is the cluster of time dependent risk events, O is the cluster of operation related risk events, R is the cluster of random risk events, $\lambda$ is the set of output functions, and to is a time-advance function.

In one or more of the above aspects, the at least one processing device is further configured to receive and store in the memory device geo-data obtained from a companion device to the in-line inspection device, wherein the companion device is external to the pipeline and configured to determine the geo-data for the in-line inspection device and generate a message to an intelligent gateway including the geo-data; and receive and store in the memory device video data from a video camera in the companion device.

In one or more of the above aspects, the at least one processing device is further configured to associate the geo-data with the in-line data from the in-line inspection device to determine a position along the length of the pipeline of the in-line data.

In one or more of the above aspects, the at least one processing device is further configured to perform data processing on the in-line data, field data and external data to generate the input for risk modeling.

In one or more of the above aspects, the in-line inspection device includes a magnetic device configured to generate a magnetic field signal in the pipeline.

In one or more of the above aspects, the companion device external to the pipeline is configured to detect the magnetic field signal from the in-line inspection device; determine the geo-data including location information for the in-line inspection device; and generate a message to an intelligent gateway including the geo-data.

In one or more of the above aspects, the in-line inspection device includes an antenna configured to interact with the wall of the pipeline to detect very-low or ultra-low frequency signals from the intelligent gateway, wherein the very-low or ultra-low frequency signals include the geo-data.

In one or more of the above aspects, the in-line inspection device includes a plurality of pressure sensors configured in different positions around and in proximity to a circumference of an inner wall of the pipeline.

In one or more of the above aspects, the in-line inspection device is configured to determine a leak in the pipeline based on a difference between two or more pressure readings from the plurality of pressure sensors being greater than a predetermined threshold.

DETAILED DESCRIPTION

The word "exemplary" or "embodiment" is used herein to mean "serving as an example, instance, or illustration." Any implementation or aspect described herein as "exemplary" or as an "embodiment" is not necessarily to be construed as preferred or advantageous over other aspects of the disclosure. Likewise, the term "aspects" does not require that all aspects of the disclosure include the discussed feature, advantage, or mode of operation.

Embodiments will now be described in detail with reference to the accompanying drawings. In the following description, numerous specific details are set forth in order to provide an understanding of the aspects described herein. It will be apparent, however, to one skilled in the art, that these and other aspects may be practiced without some or all of these specific components or with alternate components. In addition, well known steps in a method of a process may be omitted presented herein in order not to obscure the aspects of the disclosure. Similarly, well known components in a device may be omitted from figures and descriptions thereof presented herein in order not to obscure the aspects of the disclosure.

Figure 1A:
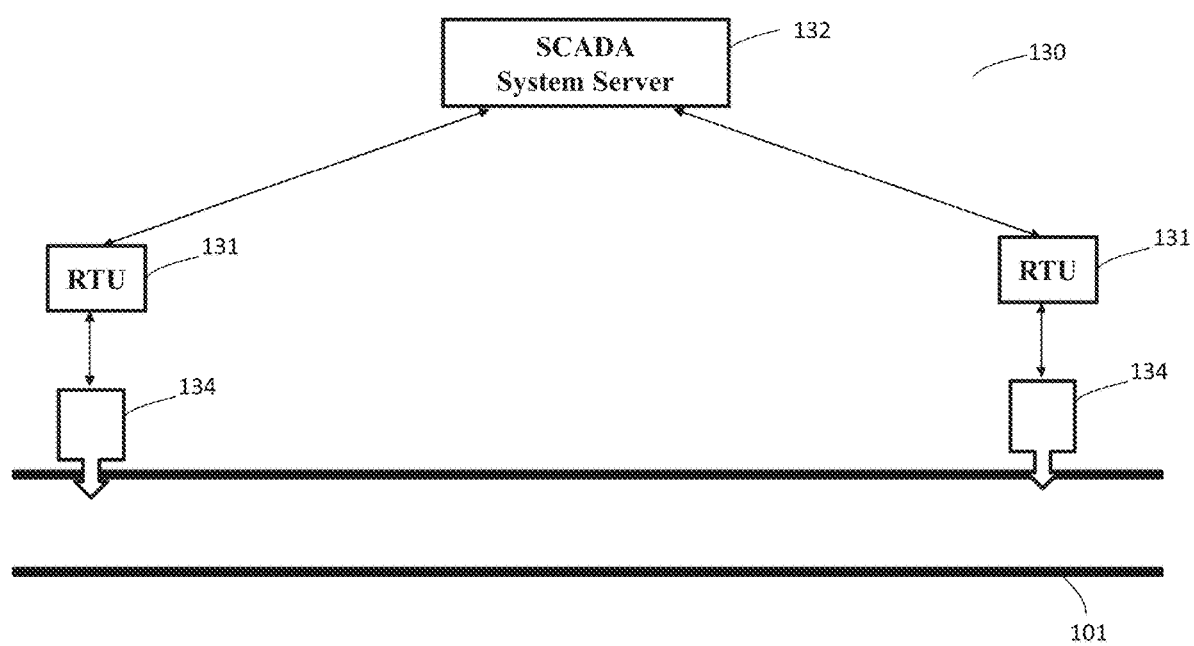
FIG. 1A illustrates a schematic block diagram of an embodiment of an operational system for pipeline transport.

FIG. 1A illustrates a schematic block diagram of an embodiment of an operational system 130 for pipeline transport. In this example, the operational system 130 includes a Supervisory Control and Data Acquisition (SCADA) system. The SCADA system 130 monitors and controls the pipeline transport. For example, the SCADA system may monitor and control field instruments 134 along the exterior length of the pipeline, including flow, pressure, and temperature gauges. These field instruments are installed along the length of the pipeline on some specific locations, such as injection or delivery stations, pump stations (liquid pipelines) or compressor stations (gas pipelines), and block valve stations. The information measured by these field instruments is then gathered in local remote terminal units (RTU) that transfer the field data to a central SCADA system server 132 in real time using communication systems, such as satellite channels, microwave links, or cellular networks. The SCADA system 130 thus provides some real-time field data at discrete points along the length of the pipeline.

The SCADA system 130 may also control and operate the pipeline remotely, from what is usually known as the "Main Control Room". In this center, the field data is consolidated in one central database. The data is received from multiple RTUs 131 along the pipeline. It is common to find RTUs installed at every station along the pipeline. The SCADA system at the Main Control Room receives the field data and presents it to the pipeline operator through a set of screens or Human Machine Interface, showing the operational conditions of the pipeline. For example, the operator can monitor the hydraulic conditions of the line, as well as send operational commands (open/close valves, turn on/off compressors or pumps, change setpoints, etc.) through the SCADA system to the field.

The SCADA system 130 however is not ideal for leak detection and risk modeling. The SCADA system may not detect a pinhole leak that only releases small quantities (<1.5% flow). When undetected, such pinhole leaks can accumulate into a substantive spill. Even with pipeline leak volumes within SCADA detection limits, sometimes pipeline leaks are misinterpreted by pipeline operators to be pump malfunctions or other problems. So, small leaks are a challenging problem for pipeline operators today because they are very difficult to detect and pose a large threat to environment and public safety. Often, the decisions of pipeline operations such as alarm event handling, emergency shutdown, pipeline leak detection and batch tracking are mostly based on the experience of the operator or on Advanced Pipeline Applications Tools with different modeling and limited predictive accuracy.

Traditionally, a risk model provides a representation of the risks throughout a pipeline system by combining inputs associated with both likelihood and consequence aspects of unintended pipeline releases. In general, the selection of a risk assessment method is driven by the knowledge and organization of inspections and additional information that have been collected during pipeline operations.

In the report, "Critical Review of Candidate Pipeline Risk Models" by Smitha Koduru, Riski Adianto, Jason Skow (published by C-FER Technologies, December 2016), a survey with 17 pipeline operators was conducted and 13 risk models were received. The key learning from the survey is that quantitative risk models have not replaced the use of qualitative models for risk-based ranking, and lack of accepted quantitative risk evaluation criteria. The report states that after reviewing 34 engineering and technology databases which covered more than 6000 science journals, a total of 70 publications were reviewed. Among them, the report states that only eight publications described system-wide applications of quantitative risk models, and the other 62 publications were related to the consequences of failures or methods on failure frequency for different threats.

Quantitative Risk Analysis (QRA) seems to be the most common decision-making approach for integrity management actions. QRA basically uses probabilities to quantify risk likelihood and measurable parameters to quantify consequences:

$$P_T = 1 - \Pi(1 - P_i)$$

$P_t$: Total Failure Probability of Pipeline $P_i$: Failure Probability of a segment due to threat i Risk analytical models could be broadly categorized into structural reliability methods like Monte Carlo simulation, probabilistic models like fault-tree methods and Bayesian Networks, as well as fuzzy logic models. However, a wide range of uncertainties will inevitably be introduced in estimating failure frequencies during the process of using Quantitative Risk Analysis (QRA) due to insufficient or uncertain data.

It has been thought commonly that uncertainty remains in any model results, and the input data are usually sources of much greater uncertainty than the method of computation. The solution with more data could emerge as the winner; even weaker models with more data do better than more complicated models with less data.

Therefore, general principles for designing a robust next generation pipeline risk models includes the following:
1. Obtaining more accurate data and additional data points to overcome the ambiguity of the traditional risk modeling methods.
2. Identifying all threats and evaluating interactive threats by including the potential for threat interactions in ways that can increase risk and identifying all risk drivers.
3. Trying to use the most complete and accurate available data and incorporating a root cause analysis of past incidents.
4. Considering the incorrect operations, which include human interactions and human performance that are significant to the likelihood of failure or have a significant effect on the consequences of failures.
5. Considering those random risk events (factors) like weather, earthquakes, natural forces as well third party threats like excavation damages.
6. Considering a full range of scenarios to capture the full spectrum of possible consequences, including the high consequence outlier.
7. Validating the risk model in light of incident, leak and failure history and other historical information, assuring the use of traceable and verifiable information and data.

It would be ideal to realize the basic 7 principles above by building an integrated inspection regime to merge the major types of pipeline inspections into a more comprehensive, risk-based approach that allows pipeline operators to use data from inspections, field instruments, pipeline characteristics, incidents and annual reports for continuously improving their integrity management programs.

PCT Application No. PCT/US2019/025438 filed Apr. 2, 2019 entitled "Intelligent Data Acquisition System and Method for Pipelines," hereby incorporated by reference herein, describes an in line inspection vehicle and a real time positioning system based on a special communication infrastructure and mechanism for obtaining high-quality, high-accuracy continuous normal pressure, flow and temperature profiles with geo-data along a pipeline to effectively improve the prediction and diagnosis of pipeline failures.

U.S. Provisional Patent Application No. 62/816,008 filed on Mar. 8, 2019 entitled "Self-Adaptive System Structure and Method for An Inline Inspection Vehicle of Pipelines" which is hereby incorporated by reference herein, describes an inline inspection vehicle with auto-adjustable and self-adaptive structure, self-propelled feature, and renewable power system.

U.S. patent application Ser. No. 16/739,459 filed on Jan. 10, 2020 and entitled, "A Renewable Power System and Method for Pipeline Inspection Tools" describes an in-line inspection device with a renewable and rechargeable power system for self-propelled inline inspection and adaptive control and is hereby incorporated by reference herein.

Overview

One of the present embodiments for the computational risk modeling system is a multi-layered, multi-staged, inspection-based, data-oriented, event-driven, dynamically cycled system-wide solution based on the innovations in the pipeline inspection technologies, establishment of intelligent integrated inspection regime, a Cluster Machine with a 11-tuple structure for a pipeline's dynamic event-driven risk modeling, data mining, machine learning and AI technologies as well as Discrete Event System Specification (DEVS) simulations.

The intelligent integrated inspection regime integrates the major types of pipeline inspections both internally and externally to collect wide range of data sets with a large number of data points or attributes from multiple data channels and sources to reduce uncertainties. The frequent applications of intelligent integrated inspection regime and collaborations of internal and external inspection devices may also reduce the pipeline failure chances caused from random risk events.

Based on a convergence of multiple data collection channels, data integrations, and real time pressure testing, the outcomes and insights from the computational risk modeling system could support leak detector and risk monitoring to prevent a pipeline's failures by improving their accuracy, sensibility, and reliability, which converges both operations and integrity management systems.

Figure 1B:
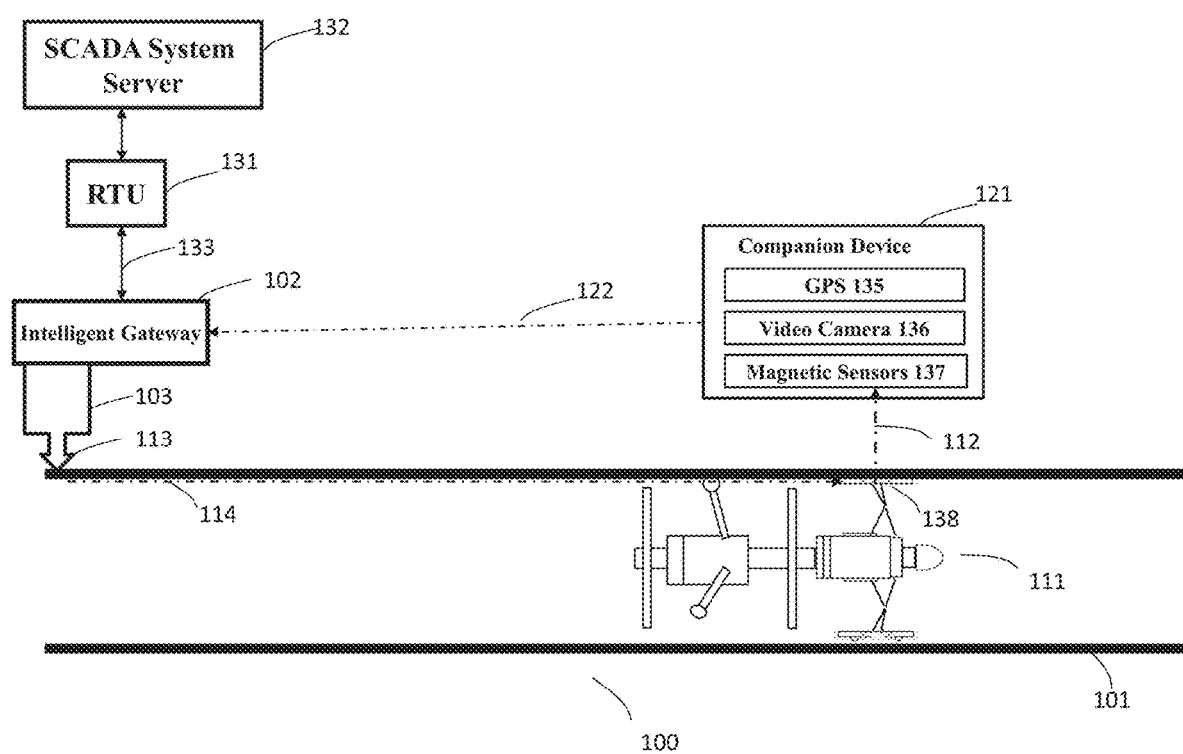
FIG. 1B illustrates a schematic block diagram of an embodiment of an intelligent integrated inspection regime for a pipeline.

FIG. 1B illustrates a schematic block diagram of an embodiment of an intelligent integrated inspection regime 100 for a pipeline 101. This embodiment is similar to embodiments in PCT Application No. PCT/US2019/025438 filed Apr. 2, 2019 entitled "Intelligent Data Acquisition System and Method for Pipelines," incorporated by reference herein. The intelligent integrated inspection regime 100 includes an in-line inspection device 111, such as a robotic detector or smart PIG, a drone or external companion device 121, a Supervisory Control and Data Acquisition (SCADA) system server 132, RTU system 131 and intelligent gateway 102. In an embodiment, the intelligent integrated inspection regime 100 includes an Intelligent Data Acquisition System providing a real time positioning based on a special communication infrastructure and mechanism having at least three different data channels as below:

Signal 122 transmitted from the companion device 121 that carries real time video information and geo-data;

Low frequency signal generator 103 and transceiver 113 that generates a message signal with geo-data 114; and Magnetic signal 112; and Data communications protocol 133 between the intelligent gateway 102 and RTU system 131 through network connections.

The Intelligent Gateway 102 receives geo-positioning data from companion device 121, e.g. a drone or other vehicle configured to track a position of the inline inspection device 111. Since two way communication through the pipeline 101 is difficult between the inline inspection device 111 and the Intelligent Gateway 102, one way communication may be implemented with Earth Mode communication.

The inline inspection device 111 includes sensors to collect real time in-line data such as pressures, temperatures, and flow profiles along the pipeline route. The inline inspection device 111 may also include various inline inspection tools for non-destructive testing (NDT) of pipelines including magnetic flux leakage (MFL) testing, ultrasound testing, electromagnetic acoustic transducer (EMAT), guided wave ultrasonic testing (GWUT), and caliper in line tools. This type of testing may detect leaking, deformations, cracking, corrosions, flaws, thickness variations, dents or other defects. The inline inspection device 111 thus obtains adequate and high-accuracy continuous data profiles along the pipeline route.

The companion device 121 in this example is in an unmanned vehicle, such as a drone, but may alternatively be carried by or implemented in a manned vehicle or other type of vehicle. For example, for offshore pipelines, companion device 121 may be included in a boat or underwater vehicle. The companion device 121 is configured to report positions of the inline inspection device 111 to the intelligent gateway 102. In one aspect, the companion device 121 may include a wireless transceiver for communicating over a radio network, cellular network, satellite network or other wireless network to the intelligent gateway 102. The companion device 121 may also include a wired transceiver interface, e.g., a USB port or other type of wired connection, for communication with one or more other devices over a LAN, MAN and/or WAN, when not in motion.

The companion device 121 follows or tracks the inline inspection device 111 in the pipeline 101. The companion device 121 includes magnetic sensors 137 that detects magnetic field signals 112 from the inline inspection device 111. The inline inspection device 111 includes a magnetic device 138, such as a magnetic and/or magnetic flux leakage (MFL) module. The magnetic device 138 generates magnetic field signals 112 in the pipeline 101 and through the earth, air and/or water for communication with the companion device 121.

The companion device 121 tracks the inline inspection device 111 in the pipeline 101 using the magnetic fields signals 112 and determines its geo-positions with the GPS 135. The companion device 121 periodically communicates messages to report GPS coordinates with a timestamp as the location of the inline inspection device 111 to the intelligent gateway 102. The geo-data may be then associated with the measurements and testing data from the in-line inspection device 111. The position along the length of the pipeline is thus determined for the data of the inline inspection device 111.

The inline inspection device 111 may occasionally adjust its speeds and states for different inspection points. In response thereto, the companion device 121 detects the magnetic field signals 112 from the inline inspection device 111 and adjusts its speed or direction. The companion device 121 is thus configured to track the inline inspection device 111 by following the pipeline 101 and/or using the information from the inline inspection device 111.

The companion device 121 may also include a video camera 136 for external inspection of the pipeline 101 to detect any cracks, damage or risk from weather or natural forces as well third-party threats like potential excavation damages. The companion device 121 may thus enhance the pipeline's integrity system with additional monitoring at the same time.

Ultra-low frequency (ULF) is the ITU designation for the frequency range of electromagnetic waves between 300 hertz and 3 kilohertz. Many types of waves in the ULF frequency band can be observed in the magnetosphere and on the ground. Communications through the ground using conduction fields is known as "Earth-Mode" communications and was first used in World War I. The transmission equipment was known as the 'Power Buzzer', an electromechanical device which produced 700 hertz pulsed DC at a high voltage. This band is also used for communications in mines, because it can penetrate the earth. Some experiments have been tried at 0.83-8.76 kilohertz including both ULF and VLF (3-30 kilohertz) bandwidths with some success and proved that buried pipes and cables may help conduction in some directions, so attenuation may be less than expected.

In an embodiment, the intelligent gateway 102 includes a low frequency signal generator 103 and transceiver 113 configured to generate low frequency (ULF or VLF) signals and modulate the ULF or VLF signals using geo-data from the companion device 121. The geo-data includes location information, such as latitude, longitude, elevation, etc. from the GPS of the companion device 121. The intelligent gateway 102 transmits the geo-data to the inline inspection device 111 through the "Earth-Mode" communication signals 114.

At the inline inspection device 111, one or more antennas are mounted for effectively interacting with the inner wall of the pipe and detecting the "Earth-Mode" communication signals 114. The communication signals 114 are processed by a communicator and GPS positioning module on the inline inspection device 111. The inline inspection device 111 may determine its geographical position in response to a communication time delay and the geo-data, including latitude, longitude and elevation. During a stop state, the inline inspection device 111 may receive the "Earth-Mode" communication signals 114 most effectively and more accurately determine its position. The inline inspection device 111 then associates its position with measurements of the pipeline. The location in the pipeline 101 of the measurements by the inline inspection device 111 may thus be determined. The Intelligent Data Acquisition System is described in more detail in the PCT Application No. PCT/US2019/025438 referenced herein.

In an embodiment, the inline inspection device 111 may include a renewable power system including a pressure-based power generator and/or a thermoelectric generator, as described in more detail in U.S. patent application Ser. No. 16/739,459 entitled, "Renewable Power System and Method for Pipeline Inspection Tools" filed on Jan. 10, 2020 and incorporated by reference herein. The inline inspection device 111 may also comprise a self-adaptive inspection vehicle with self-adjustable carrier racks carrying positioning rollers and inspection device carts, and self-adaptive driving turbine wheels for auto-adjustable driving speeds, as described in more detail in U.S. Provisional Patent Application No. 62/816,008 entitled, "Self-Adaptive System Structure and Method for an Inline Inspection Vehicle of Pipelines" filed on Mar. 8, 2019 and incorporated by reference herein. In an embodiment, implementing a Renewable Power System 143 and Self-Adaptive Inline Inspection Vehicle 142, the In-Line Inspection Device 141 is configured to navigate inside a pipeline with auto-adjustable, self-adaptive and self-propelled features to inspect the pipeline more intelligently, accurately, effectively, efficiently, and completely.

In an embodiment, the inline inspection device 111 is a complement to SCADA systems. The data and measurements from the inline inspection device 111 are compatible with existing Supervisory Control and Data Acquisition (SCADA) systems or with other such operational systems.

Figure 1C:
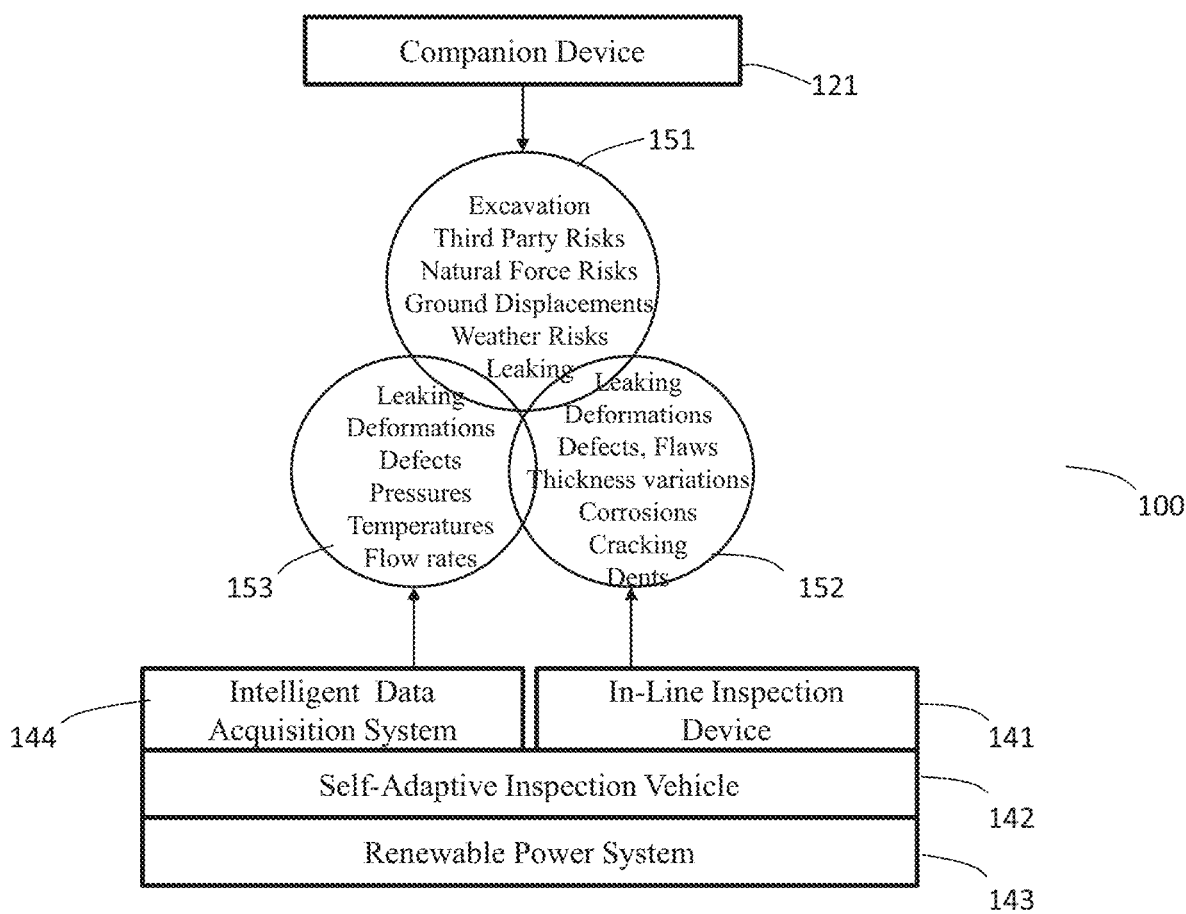
FIG. 1C illustrates a schematic block diagram of an embodiment of output data sets of the intelligent integrated inspection regime.

FIG. 1C illustrates a schematic block diagram of an embodiment of the output data sets of the intelligent integrated inspection regime 100. In an embodiment, implementing a Renewable Power System 143 and Self-Adaptive Inline Inspection Vehicle 142, the In-Line Inspection Device 141 is configured to navigate inside a pipeline with auto-adjustable, self-adaptive and self-propelled features to inspect the pipeline more intelligently, accurately, effectively, efficiently, and completely. By working together with a drone or other external companion device 121 and an intelligent gateway 102 in an intelligent data acquisition system 144, this intelligent integrated inspection regime 100 integrates the major types of pipeline inspections to collect a wide range of data sets 151, 152, and 153 with a large number of data points or attributes from multiple data channels and sources (e.g., external to the pipeline and internal to the pipeline) to significantly reduce uncertainty and ambiguity.

With the innovations herein in pipeline inspection tools, multiple data sets from different channels and sources may be collected, combined and converged to create a large data foundation for the pipeline risk modeling. For example, internal data from the inline inspection vehicle 142 may be combined with the external data from the video camera of the companion device 121 for a portion of the pipeline using the geo-data. However, the Interacting Threat Matrix and Fault Tree Models of oil and gas pipelines are notable examples of systems that are too complex to model all kinds of threats with Quantitative Risk Analysis Model. Because the power and capabilities of computer processing may lead to significant advances in modeling, more computational resources should be considered. A computational risk modeling with artificial intelligence approach is an advantageous solution to handle the risk modeling system's complexity and challenges on processing the extremely large size of the datasets.

A Turing machine is a mathematical model of computation that defines an abstract machine which manipulates symbols on a strip of tape according to a table of rules. Given any computer algorithm, a Turing machine capable of simulating that algorithm's logic can be constructed. The Turing machine can be formally defined as a 7-tuple M defined as:

$$M=\langle Q,\Gamma,b,\Sigma,\delta,q_0,F\rangle$$

where
Q is a finite, non-empty set of states;
$\Gamma$ is a finite, non-empty set of tape alphabet symbols;
$b\in\Gamma$ is the blank symbol (the only symbol allowed to occur on the tape infinitely often at any step during the computation);
$\Sigma\subseteq\Gamma\setminus\{b\}$ is the set of input symbols, that is, the set of symbols allowed to appear in the initial tape contents;
$q_0\in Q$ is the initial state;
$F\subseteq Q$ is the set of final states or accepting states.
$\delta:(Q\setminus F)\times\Gamma \not\rightarrow Q\times\Gamma\times\{L,R\}$ is a partial function called the transition function, where L is left shift, R is right shift.
The initial tape contents is said to be accepted by M if it eventually halts in a state from F.

Based on the Turing machine, Automata Theory on computer science and discrete mathematics was formed. The Automata Theory and its finite state machine had been used in the modeling for the discrete event dynamic system (DEDS). A discrete event dynamic system (DEDS) is a discrete-state, event-driven system of which the state evolution depends entirely on the occurrence of asynchronous discrete events over time. With the properties of the discrete state spaces and event-driven state transition mechanisms, a pipeline risk modeling system could be considered as a discrete event dynamic system (DEDS).

Figure 2A:
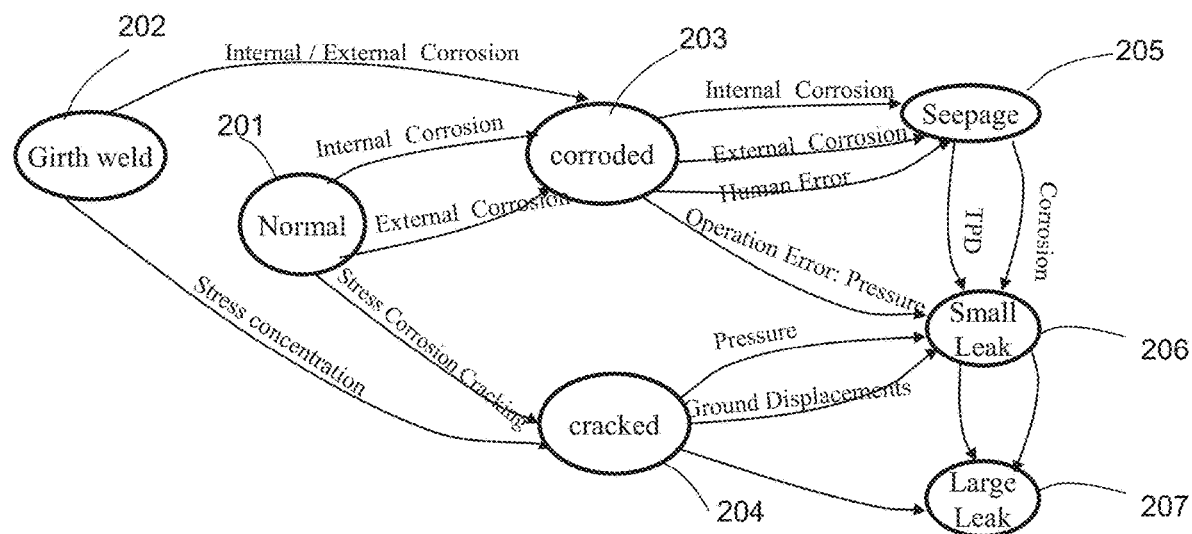
FIG. 2A illustrates a schematic block diagram of an embodiment of a finite state machine for pipeline risk modeling with a plurality of states.

FIG. 2A illustrates a schematic block diagram of an embodiment of a finite state machine for pipeline risk modeling with a plurality of states. In this example, seven states are described though a plurality of other states may be implemented as described herein. There are two initial states: Normal 201 represents that one position of the pipeline is at the normal status, Girth weld 202 represents that the welding position of the pipeline may potentially exhibit softening and brittleness or other risks. Two transition states as threats or risk drivers are corroded 203 and cracked 204. Three failure states as Seepage 205, Small Leak 206, Large Leak 207 could be considered as final states once any one is discovered. This graph shows us that there is huge volume of possible interactions and combinations among states and events. Although it is not a complete graph with all cause effect scenarios, it properly demonstrates the event-driven state transition mechanisms for the risks, threats, and failures as well as their correlations and interactions in pipeline operations. However, this finite state machine model obviously suffers from the problem of state and event explosion for too many cause-effect combinations and interactions.

The Discrete Event system Specification (DEVS) described by Bernard P. Zeigler is a formalism for compositional modeling and simulation of discrete event systems (DES). DEVS was described in the book, "Theory of Modeling and Simulation," by Bernard P. Zeigler, Herbert Praehofer, Tag Gon Kim (Academic Press, $2^{nd}$ Edition 2000). Similar to the Turing machine, a discrete event system specification (DEVS) is a structure with a 8-tuple defined as:

$$M=\langle X,S,Y,\delta_{int},\delta_{ext},\delta_{con},\lambda,ta\rangle$$

Wherein:
X is the set of input values,
S is a set of states,
Y is the set of output values,
$\delta_{int}:S\rightarrow S$ is the internal transition function,
$\delta_{ext}:Q\times X\rightarrow S$ is the external transition function,
$\delta_{con}:Q\times X\rightarrow S$ is the confluent transition function,
ta: $S\rightarrow R^+_{0,\infty}$, and $R^+_{0,\infty}$ is the set of positive real numbers with 0 and $\infty$
$(Q=\{(s,e)|s\in S, 0\leq e\leq ta(s)\}$ is the total state set,
e is the time elapsed since last transition)
$\lambda:S\rightarrow Y$ is the output function
In the DEVS formalism, simulation of the model of the simulator allows for the quantitative analysis of reliability and performance of different alternative simulator designs.

DEVS is a popular formalism for modeling complex dynamic systems using a discrete-event abstraction for modeling the rules of a communication protocol, the movement of parts in an automated manufacturing system, or the automation logic in a process control system. Although it could be a great approach, DEVS may not be perfectly fit for pipeline risk modeling system to meet the requirements from all scenarios and uncertainties.

As an extended version of finite state machine and DEVS formalism, a Cluster Machine is a finite state machine driven by clusters of risk events. A Cluster Machine is presented here with a 11-tuple structure for modeling risk in dynamic systems of pipelines:

$$M=\langle X,S,Y,\delta_t,\delta_e,\delta_c,\lambda,T,O,R,ta\rangle$$

Where
X: is the set of input values
$X_v\in X$, is a set of Input variables with their values,
$X_c\in X$ is a set of Input parameters with their constant values, S: is a set of states
  $S_i$: $S_i \in S$, is a set of initial states,
  $S_t$: $S_t \in S$, is a set of transition states,
  $S_f$: $S_f \in S$, is a set of failure mode states,
  $S_e$: $S_e \in S_f$, $S_e$ is one failure mode state at the end status
Y: is a set of output values,
$\delta_i$: $S \rightarrow S$, is the set of internal transition functions,
  $\delta_{ic}$: $\delta_{ic} \in \delta_i$, is a set of corrosion based transition functions,
  $\delta_{is}$: $\delta_{is} \in \delta_i$, is a set of stress based transition functions,
  $\delta_{ip}$: $\delta_{ip} \in \delta_i$, is a set of pressure-defect based transition functions,
$\delta_e$: $Q \times X \rightarrow S$ is the set of external transition functions,
$\delta_c$: $Q \times X \rightarrow S$ is the set of confluent transition functions,
T: is the cluster of time dependent risk events,
O: is the cluster of operation related risk events,
R: is the cluster of random risk events,
λ: $S \rightarrow Y$ is the set of output functions,
ta: is a time-advance function $S \rightarrow R^+_{0,\infty}$, and $R^+_{0,\infty}$ is the set of positive real numbers with 0 and ∞ (Q={(s,e) |s∈S, 0≤e≤ta(s)} is the total state set, e is the time elapsed since last transition)
$\delta = \delta_i \cup \delta_e \cup \delta_c$, δ is the total set of transition functions,
T={$(X_t,\delta_t)|X_t \in X, \delta_t \in \delta$},
O={$(X_o,\delta_o)|X_o \in X, \delta_o \in \delta$},
R={$(X_r,\delta_r)|X_r \in X, \delta_r \in \delta$}

The Cluster Machine in this embodiment includes three risk event clusters: T, O, R. In another embodiment, these risk event clusters may be converted and mapped to corresponding sets of internal, external, or confluent transition functions as well as input variables and their values.

Figure 2B:
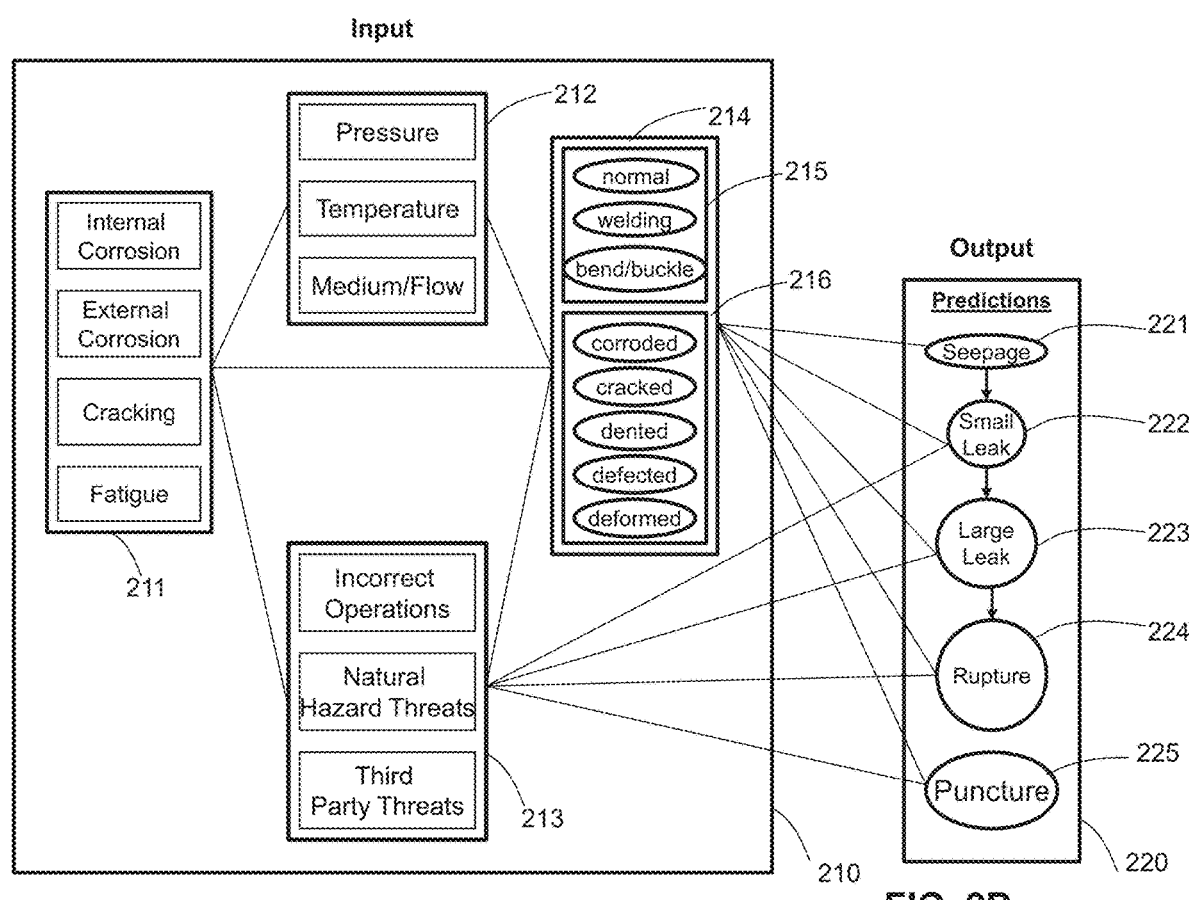
FIG. 2B illustrates a schematic block diagram of an embodiment of a Cluster Machine with input and output.

FIG. 2B illustrates a schematic block diagram of an embodiment of the Cluster Machine for modeling risk in dynamic systems of pipelines proposed herein with input 210 and output 220. In an embodiment, the set of failure mode states $S_f$ in the output 220 of the Cluster Machine includes 5 failure mode states: Seepage 221, Small leak 222, Large Leak 223, Rupture 224, and Puncture 225. Each of the failure mode states may be designated as a final ending state $S_e$. Once an ending state is determined, a system shut down may then be initiated. Though five failure mode states are illustrated in this embodiment, fewer or more failure mode states may be defined in other implementations.

The most common definition on failure modes in the European Gas Pipeline Incident Data Group includes three levels:
  Small leak—hole size is less than 20 mm (or d/D<=0.2);
  Large leak—hole size is 20-80 mm (or d/D>0.2);
  Rupture—hole size is bigger than 80 mm (or d/D≈1);
  (where, d/D: the ratio of size of leak hole to the pipe diameter)

However, there was a study on distributions of incidents by failure mode and ignition based on a total of 464 incidents on onshore gas transmission pipelines which were reported to PHMSA between 2010 and 2013. The distributions of failure modes were classified and calculated as: Leak: 30%, Rupture: 38%, Mechanical Puncture: 20%, and Others: 12%. As such, puncture may also be included as a failure mode.

Seepage 221 is a tiny and slow leaking status which is much lighter than the small leaking. For example, a small leak may be defined as a hole size is less than 20 mm-5 mm and seepage may be a hole size that is less than 5 mm (e.g., but it could be considered as the critical point for pipeline failure or threshold for pipeline bursting). Rupture 224 is absolutely considered as the most severe failure mode or end state $S_e$, which is the worst case for pipeline failures.

In FIG. 2B, input box 210 includes input states ($S_i$, $\cup S_t$) 214 such as initial states $S_i$ 215 and transition states $S_t$ 216. The initial states $S_i$ 215 may include, e.g., normal, welding and bend/buckle. The transition states $S_t$ 216 may include, e.g., corroded, cracked, dented, defected, and deformed. Additional and/or alternate initial states $S_i$ 215 and transition states $S_t$ 216 may also be implemented herein.

Input box 210 also includes three discrete event clusters such as time dependent risk event cluster 211, operation related risk event cluster 212, and random risk cluster 213. The time dependent risk event cluster 211 may include, e.g., internal corrosion, external corrosion, cracking and fatigue. The operation related risk event cluster 212 may include, e.g. pressure, temperature and medium/flow. The random risk cluster 213 may include, e.g. incorrect operation, natural hazard threats (e.g., weather, earthquake) and third party threats (e.g., vandalism, accidental excavation damage). Additional and/or alternate events may be included in the event clusters. Additional and/or alternate event clusters may also be included in the input 210.

Working the same as the principles of computers, Cluster Machine determines the next state from the present state according to a set of rules which could be called transition functions, so that it may enumerate the possible transition paths (failure paths) from an initial state to a final state for the possible interactions and combinations among states and events.

As a part of artificial intelligence (AI), machine learning is a data science technique that allows processing devices to use existing data to predict future behaviors, outcomes, and trends. The predictions are based on a learning process and detecting patterns. Because intelligent integrated inspection regime 100 combines major types of pipeline inspections to collect a wide range of data sets with a large number of data points or attributes from multiple data channels and sources, machine learning or AI is an ideal tool to study and discover different kinds of pipeline failure mechanisms. The failure mechanism learning is based on a large data foundation and possible transition paths from an initial state to a final state that may be concluded from the simulations on the possible interactions and combinations among states and events.

Figure 3:
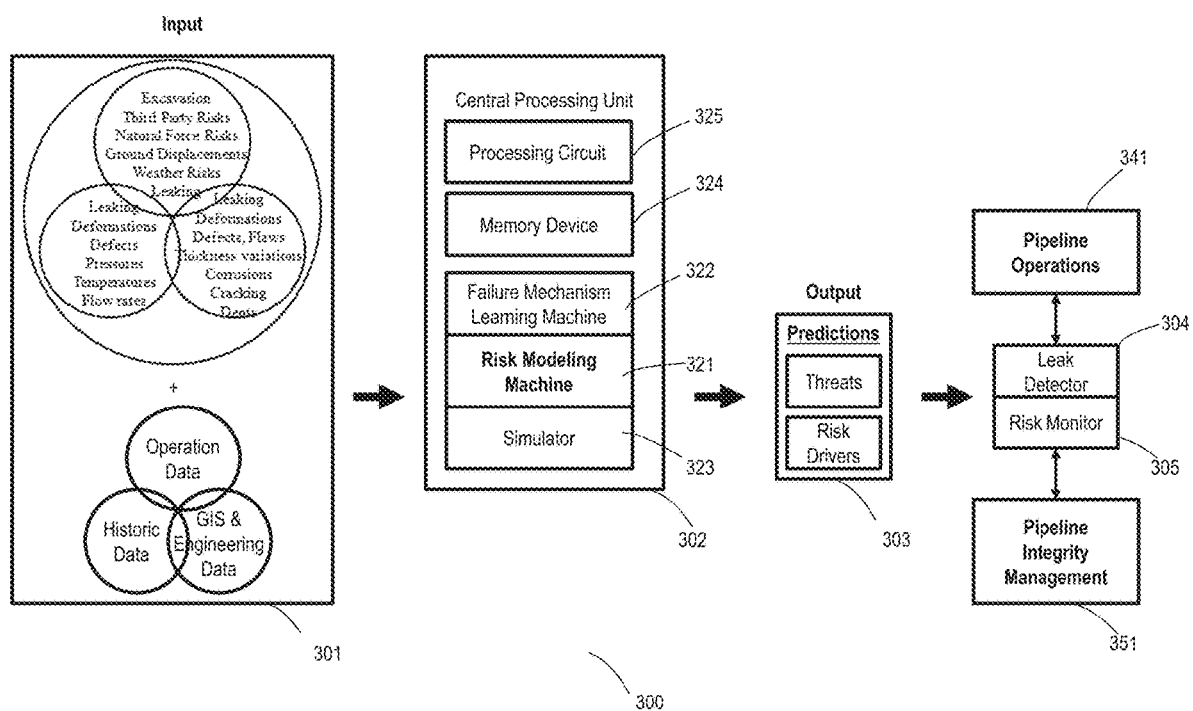
FIG. 3 illustrates a schematic block diagram of an embodiment of a process for the computational risk modeling system for both operation support and integrity management.
Figure 7:
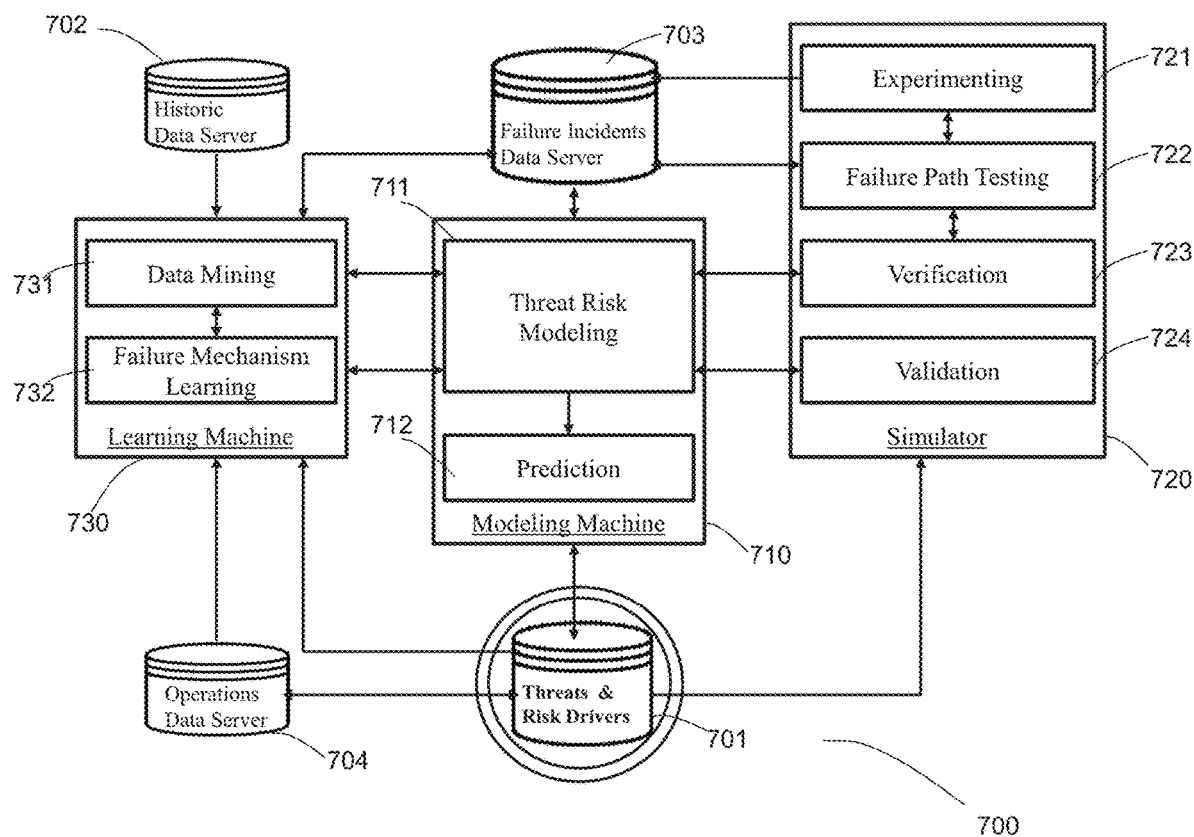
FIG. 7 illustrates a schematic block diagram of an embodiment of a structure and workflow of a central processing unit.

FIG. 3 illustrates a schematic block diagram of an embodiment of a process of the computational risk modeling system 300 for both operation support and integrity management. Because a Turing machine is a general example of a central processing unit (CPU) that controls the data manipulation performed by a computer, central processing unit 302 of computational risk modeling system 300 is a physical device and implementation of the Cluster Machine though other risk modeling techniques may be implemented herein. FIG. 7 explains the structure and processes of central processing unit 302 in more detail.

The computational risk modeling system 300 combines data sets from different data sources and channels as the system input 301. For example, the operation data includes the field data obtained at discrete points along the pipeline from the operational system (e.g., the SCADA system 130). The datasets may also include historic data, such as the in-line data obtained from the inline inspection vehicle along the interior of the pipeline, e.g., leaking, deformations, defects, cracking, corrosions, flaws, pressures, temperatures, flow rates, thickness variations, dents or other data. The in-line data is associated with the geo-data from the companion device 121 for integration. The historic data may also include external data of the pipeline from the video camera of the companion device 121. Geographic information systems (GIS) data and engineering data may also be included as datasets. Other data may be included, such as known excavations, third party risks, natural force risks, ground displacements, weather risks, or leaks.

The central processing unit 302 includes risk modeling machine 321 with two supporting components called failure mechanism learning machine 322 and simulator 323. The risk modeling machine 321 is implemented using one or more processing circuits 325 communicatively coupled to one or more memory devices 324. In one aspect, the memory device 324 may include one or more non-transitory processor readable memories that store instructions which when executed by the one or more processing circuits 325, causes the one or more processing circuits 325 to perform one or more functions described herein.

The output 303 of the central processing unit is the set of threats and risk drivers as well as predictions associated with the set of failure mode states. The outcomes and insights in output 303 could support two devices such as leak detector 304 and risk monitor 305 to prevent a pipeline's failures by improving the accuracy of prediction and diagnosis, which converges two disruptive systems such as pipeline operation system 341 and pipeline integrity management system 351.

For example, in use, the historic data, operation data and GIS & engineering data are processed to generate input into the risk modeling machine 302. The risk modeling machine 302 performs a risk modeling analysis on the input 301 to generate an output 303. The risk modeling machine 302 may generate an output including a predication of a failure mode state, such as a risk of leaking at a portion of the pipeline. The pipeline operation system 341 may then initiate risk monitoring for the portion of the pipeline and request additional inspections by the in-line inspection vehicle for the portion of the pipeline.

Figure 4:
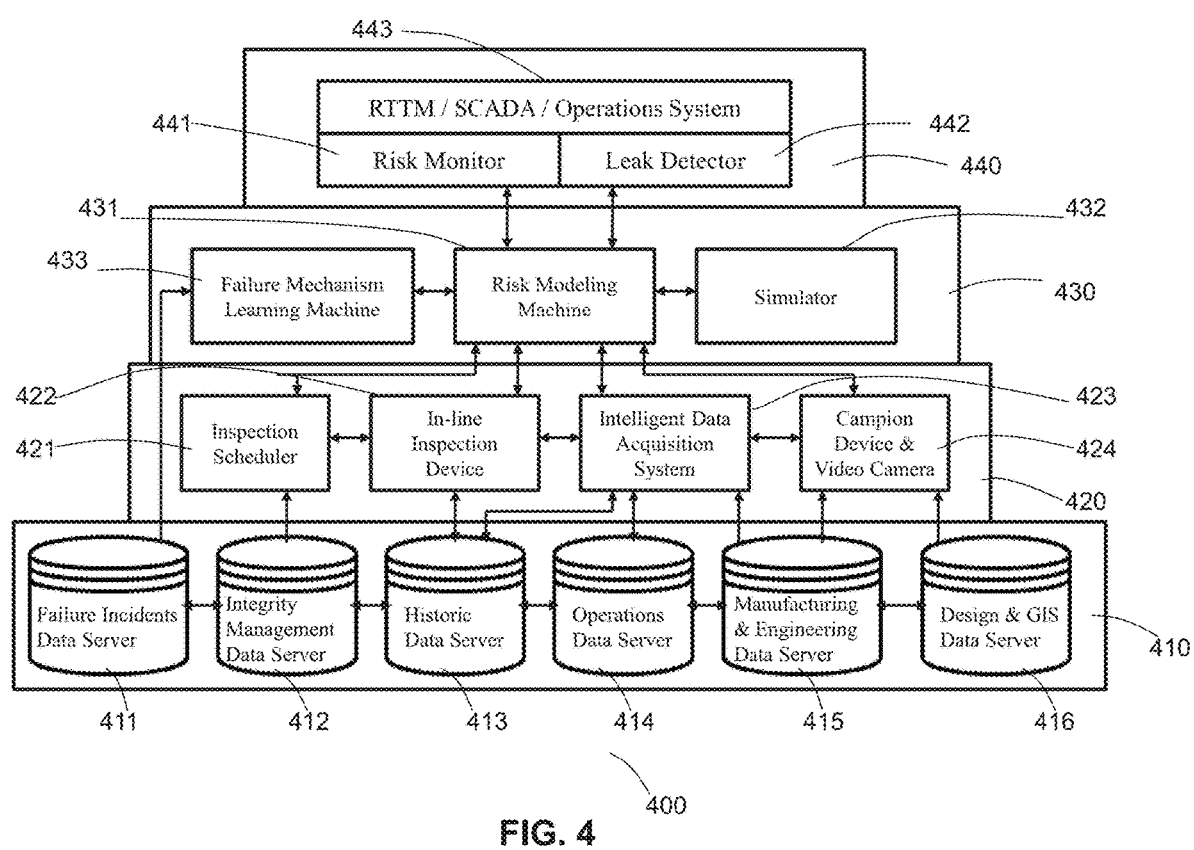
FIG. 4 illustrates a schematic block diagram of an embodiment of a structure of the computational risk modeling system.

FIG. 4 illustrates a schematic block diagram of an embodiment of the structure of the computational risk modeling system 400. The computational risk modeling system is for pipeline operation and integrity management and includes a multi-layered architecture based on system specification and simplification. In an embodiment, the plurality of layers include the Data Connection Layer 410, Inspection Interface Layer 420, Central Risk Modeling Layer 430, and Supervisory Control and Monitoring Layer 440.

At the Data Connection Layer 410, data from external and internal sources are integrated with the computational risk modeling system 400. The external data sources include, e.g. industrial libraries and literature and inspection rules from Integrity Management Regulations, The data from these external sources are modularized and stored as datasets in Failure Incidents Data Server 411 and Integrity Management Data Server 412 respectively. The historic inspection data is stored on Historic Data Server 413 and includes the inspection data from the intelligent integrated inspection regime 100 for a pipeline 101, such as data from the inline inspection vehicle 111 and companion device 121.

Operation Data includes data on the operation of the pipeline and is mostly generated from the operational system and stored on the Operations Data Server 414. In one example, the operation system includes a SCADA system.

Data on the pipeline materials, manufacturing, fabrications and pipeline constructions is stored on Manufacturing & Engineering Data Server 415. Data related to design specifications for structure and operation parameters, and GIS and ground information along the pipeline route and pipeline splitting into different segments are modularized and stored into Design & GIS Data Server 416. Unstructured data could be archived or stored into a NoSQL database with a big data solution for data mining on the data servers. Though different servers are illustrated herein, the plurality of datasets may be stored on one or more data servers, e.g., in different databases. The one or more servers each include memory devices for storing the data. Additional or alternative datasets may be defined and implemented in the Data Connection Layer 410. The Data Connection Layer 410 thus includes data from a plurality of sources.

At the Inspection Interface Layer 420, data source connections and data channel component interactions are constructed. The inspection instructions from Inspection Scheduler 421 are transmitted to inspection devices, such as the In-line Inspection Device 422. As components of intelligent integrated inspection regime 100, data from the In-line Inspection Device 422, Intelligent Data Acquisition System 423, and the Video Camera 424 or other data from the companion device 121 are converged, and their output data sets are interpreted, combined and stored into the Historic Data Server 413.

At the Central Risk Modeling Layer 430, the Risk Modeling Machine 431, simulator 432, and Failure Mechanism Learning Machine 433 work as the central processing unit 302. Data input includes both new inspection data sets from the Inspection Interface Layer 420 and historic data sets and failure incident data from the Data Connection Layer 410.

At the Supervisory Control and Monitoring Layer 440, the Risk Monitor 441 and Leak Detector 442 interact with real time transient model (RTTM) on SCADA System and Operations System 443 by receiving, processing, and visualizing the outcomes, insights and predictions from the Central Risk Modeling layer 430 to prevent a pipeline's failures.

Figure 5A:
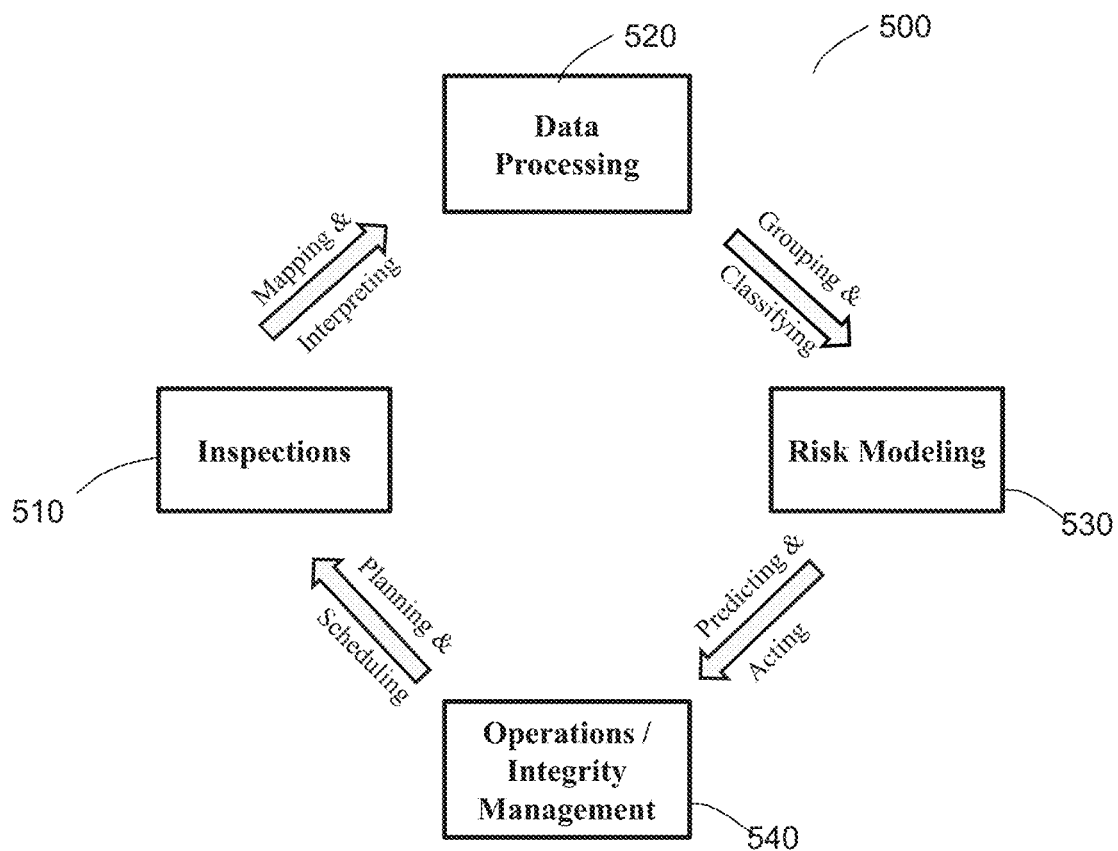
FIG. 5A illustrates a schematic block diagram of an embodiment of a staged dynamic risk modeling life cycle.

FIG. 5A illustrates a schematic block diagram of an embodiment of the staged dynamic risk modeling life cycle 500. First, the inspections 510 are jointly driven by the multi-channeled devices in the intelligent integrated inspection regime 100. The real time data from the inline inspection device 111 is mapped with geo-information during the collection processes. The data may be interpreted efficiently into corresponding attributes to form multi-dimensioned and wide-ranged data sets.

Second, data processing 520 groups, integrates and manipulates data from different sources either historic data or newly collected field data from the operational system 130 and classifies the data into event-driven groups for modeling requirements.

Third, risk modeling 530 is based on data grouping, data re-sampling, and data mining techniques. The simulation with DEVS, graph theory and failure mechanism learning is based on machine learning principles which is further described with respect to FIG. 7. The risk modeling 530 generates predications and potential actions.

Fourth, with the outcomes and predictions from the risk modeling stage 530, operations and integrity management stage 540 initiates maintenance, repairs, risk monitoring, leak detection, as well as inspection planning and scheduling for a next round of the cycle.

Therefore, this computational risk modeling system is a multi-staged, inspection-based, data-oriented, event-driven, dynamically cycled system-wide solution.

Figure 5B:
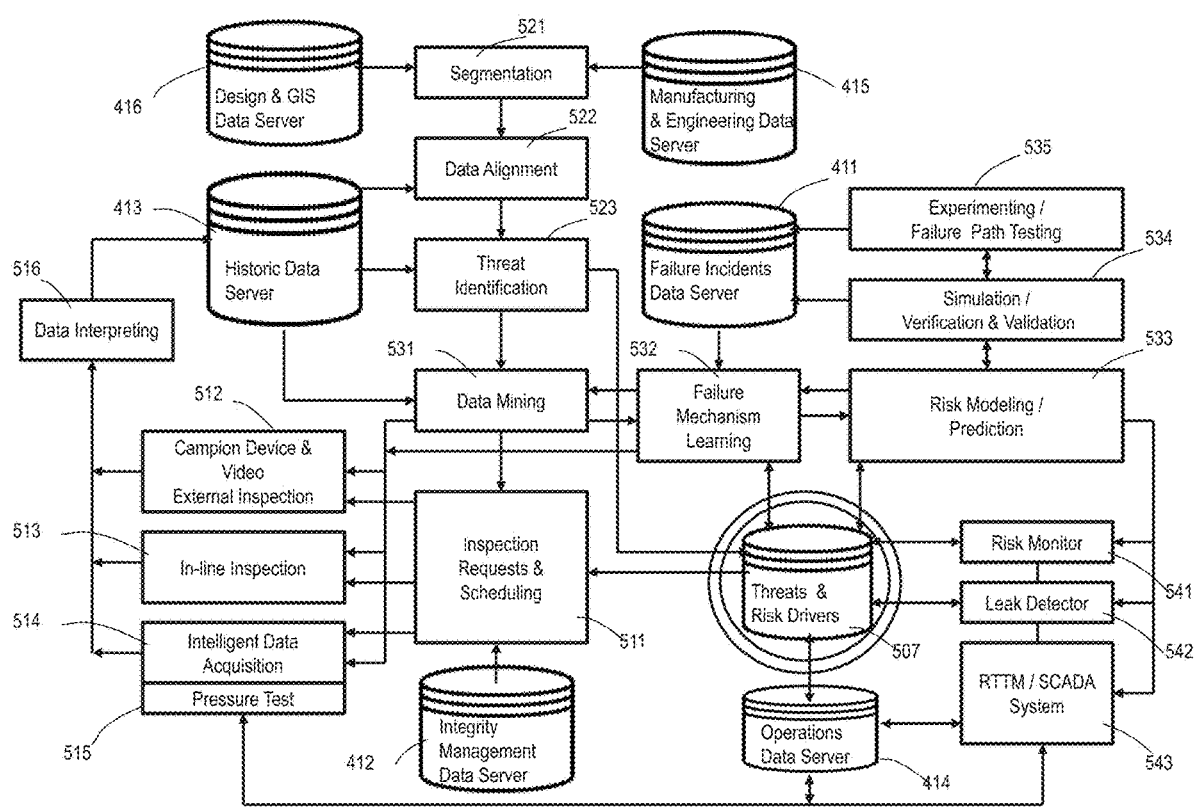
FIG. 5B illustrates a schematic block diagram of an embodiment of a workflow chart of the computational risk modeling system.

FIG. 5B illustrates a schematic block diagram of an embodiment of a workflow chart of the computational risk modeling system. The staged dynamic risk modeling life cycle 500 is explained in more details.

The Inspections stage 510 includes Inspection Requests & Scheduling 511, Companion Device & Video External Inspection 512, Smart In-line Inspection 513, Intelligent Data Acquisition 514, Pressure Test 515, and Data Interpreting 516. The Data Processing Stage 520 includes Segmentation 521, Data Alignment 522, and Threat Identification 523.

At the third stage, Risk Modeling 530 includes Data Mining 531, Failure Mechanism Learning 532, Risk Modeling/Prediction 533, Simulation/Verification & Validation 534, and Experimenting/Failure Path Testing 535. This stage is explained in more detail with respect to FIG. 7.

At the fourth stage 540, the outcomes, insights, and predictions on threats and risk drivers 507 from Risk Modeling 530 are input to Risk Monitor 541, Leak Detector 542, RTTM (real time transient model) and SCADA System 543 to support supervisory control, operation monitoring on vulnerable points, and detecting seepages or possible failures that may precede or indicate severe failures. The results on threats and risk drivers 507 are also transmitted to Inspection Requests & Scheduling 511 for pipeline integrity management applications and initiating the next round of the cycle. The outcomes, insights, and predictions on threats and risk drivers 507 from Risk Modeling 530 are transmitted to Companion Device & Video External Inspection 512, Smart In-line Inspection 513, and Intelligent Data Acquisition 514 as instructions for external or internal inspections, which may trigger some detail inspections and data collections on some critical locations, points, threats. Insights like pattern recognitions from machine learning could be integrated with inspection devices to make them more keen, sensitive and intelligent on problem identification.

Currently in pipeline integrity management, the rules on both gas and liquid pipelines require risk analysis and assessment with data integration. In fact, it has been the most common problem and challenge because data is often collected in different formats, for different reasons, and without common identifiers, so effective integration can be nearly impossible. The collaborations of inspection devices in the intelligent integrated inspection regime 100 may help overcome the challenges and difficulties faced by the pipeline industry.

Figure 6A:
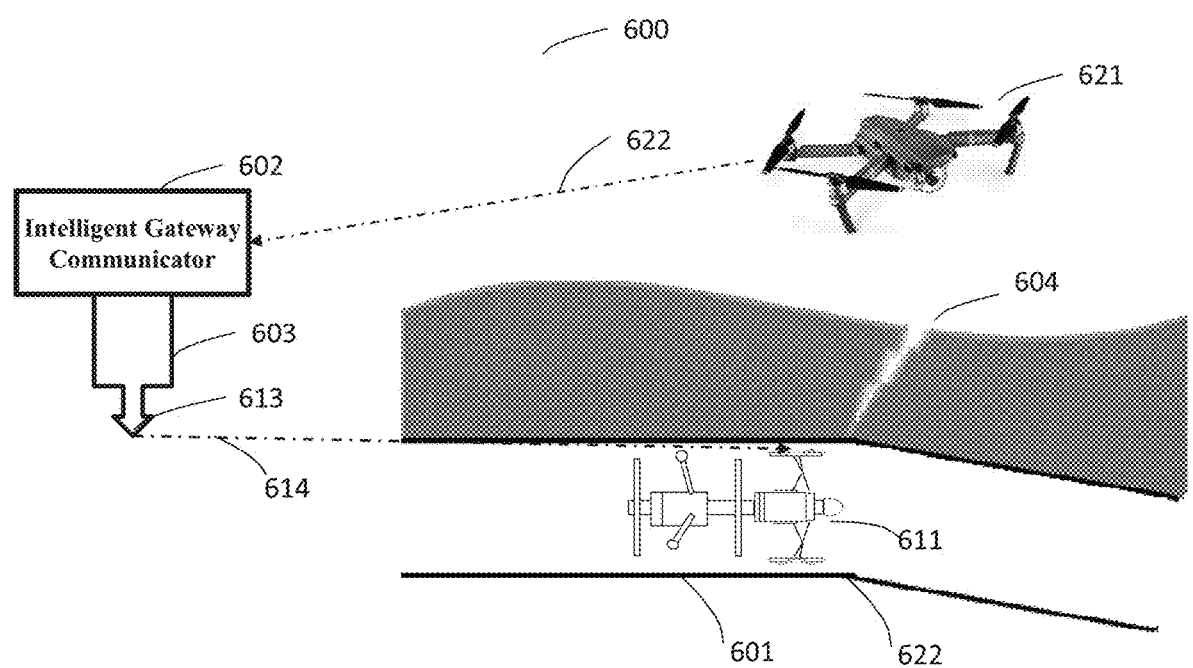
FIG. 6A illustrates a schematic block diagram of an embodiment of collaborations of inspection devices of the intelligent integrated inspection regime.

FIG. 6A illustrates a schematic block diagram of an embodiment of collaborations of inspection devices of the intelligent integrated inspection regime 600. Basically, sensors and testing devices of the In-line Inspection 513 and Intelligent Data Acquisition 514 may be installed and carried on the Self-Adaptive Inspection Vehicle to build an intelligent integrated in-line inspection device 611, which is equipped with a renewable and rechargeable power system for self-propelled inline inspection and adaptive control.

The in-line inspection device 611 may navigate self-adaptively inside pipeline 601 and be guided by the companion device, such as drone 621. A communication structure between the devices is implemented with the wireless signal 622, intelligent gateway communicator 602, Low frequency signal generator 603 and transceiver 613, and message signal with geo-data 614.

The interactions between in-line inspection device 611 and external inspection device 621 generates a common pipeline position between the internal data set of the in-line inspection device 611 and external data set of the external inspection device 621. The internal and external datasets may be mapped using the geo-info to include common identifiers of positions along the pipeline during the process of inspections and data collections. This mapping improves the data quality and makes effective data integrations possible.

For example, at the location with ground displacement 604, soil movement may cause the pipeline deformation 622. Both the in-line inspection device 611 and the external inspection device, e.g., the video camera on the drone 621, may detect the pipeline deformation 622 from different points of view. The in-line inspection device 611 and the drone 621 collect data from different channels (internal and external to the pipeline) and create multiple data sets. The multiple data sets from the external and internal measurements of the pipeline relating to the same deformation 604 may be integrated using the geo-info and then processed for risk modeling and assessments.

About 40-50% of the significant accidents are caused by time-independent events or random risk events which brings uncertainty and ambiguity to predicting the failures of pipelines. For random risk events, such as third party/mechanical damage, excavation, vandalism, weather-related and outside forces, frequent external inspections by drones and joint inspections with in-line inspection device 611 and external inspection device 621 may find potential issues more quickly. It may reduce the pipeline failure chances caused from random risk events to help overcome uncertainties. Moreover, the data on time-independent or random risk events collected by the intelligent integrated inspection regime 600 may be used effectively for risk modeling based on the methodology of the Cluster Machine to improve the risk modeling system's applicability, suitability, fitness, and accuracy.

Figure 6B:
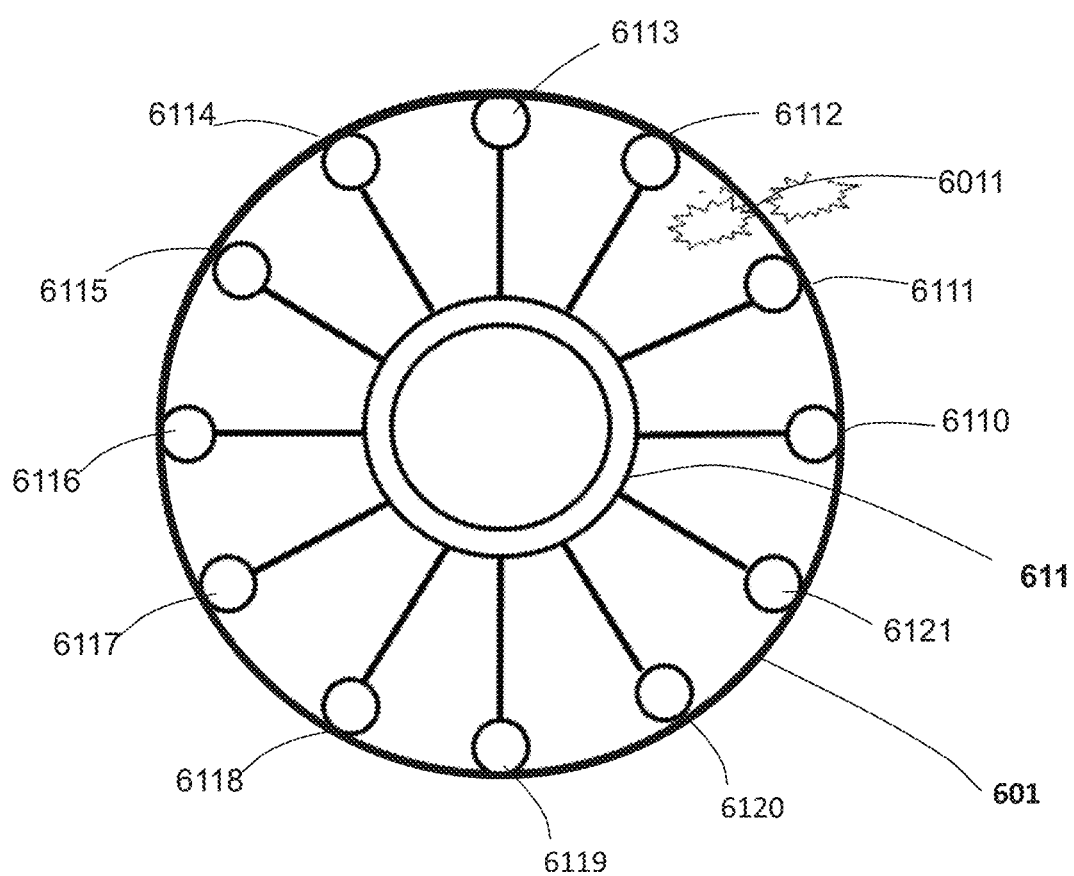
FIG. 6B illustrates a schematic block diagram of an embodiment of a cross view of pressure testing for leak detection with an Internal Intelligent Data Acquisition device.

ASME B31.8S provides pressure testing as one of the three integrity assessment methodologies. During the testing, pressures are between 1.25 to 1.5 times of Maximum Allowable Operating Pressure (MAOP). It may take days for a pipeline to be filled with water or other fluid/gas to obtain these testing pressures. It costs between $150,000 to $500,000 for testing of a single mile of pipeline. Because in-line inspection is less expensive, with a cost up to $5000 per mile, more than 92% of the pipeline miles are assessed using an in-line inspection tool. With its cost effective advantage, the in-line inspection device 611 of the intelligent integrated inspection regime 100 may perform a real time pressure test 515 as shown in FIG. 6B. The in-line inspection device 611 may perform both a strength test and a leak test as explained in more detail with respect to FIG. 6B.

FIG. 6B illustrates a schematic block diagram of an embodiment of a cross view of a pressure test with an in-line inspection device 111, such as the Intelligent Data Acquisition device of the intelligent integrated inspection regime 100. In an embodiment, there are 12 pressure sensors 6110, 6111, 6112, 6113, 6114, 6115, 6116, 6117, 6118, 6119, 6120, 6121 installed on the internal inspection device 611. The sensors are arranged around and positioned on the in line inspection device 611 in close proximity to the inner wall of the pipeline 601. Under normal conditions, the pressure distribution along the inner wall of the pipeline 601 should be approximately even. So, the pressure differences between any two pressure sensors is relatively small.

In an example, there is a leaking point 6011 on the pipeline 601. Because the leaking point 6011 is located between 6111 and 6112, the pressure values measured at pressure sensors 6111 and 6112 should be lower than the pressure values measured at pressure sensors 6113, 6110. The pressure difference between sensors increases with increasing distance from the leaking point 6011. So, the largest pressure differences should be between pressure sensors 6112 and 6118 or between pressure sensors 6111 and 6117. So, now the pressure differences between the two pressure sensors, e.g., between 6111 and 6117 or between 6112 and 6118, is relatively large in comparison to normal operating conditions.

In use, the in-line inspection device 111 collects pressure readings at a plurality of points arranged around and in proximity to the circumference of an inner wall of the pipeline 601 at an approximately same position along the length of the pipeline. When a difference between two or more pressure readings at different points around the circumference are greater than a predetermined threshold, then a leak is determined. The geo-info from the companion device 121 may provide a location of the position of the leak along the length of the pipeline. In addition, the value of the difference between the two or more pressure readings may indicate a size of the leak, e.g. a pinhole leak, small leak, large leak, or rupture. In general, the size of the leak increases as the difference between the two or more pressure readings increases. The pressure stability test around the inner wall of the pipeline 601 can thus detect leaking and even identify the position of the leaking along the length of the pipeline.

Theoretically, there is pressure loss due to friction along a given length of pipe to the average velocity of the fluid flow. In fluid dynamics, the Darcy-Weisbach equation is an empirical model:

$$\frac{\Delta p}{L} = f_D \cdot \frac{\rho}{2} \cdot \frac{\langle v \rangle^2}{D}$$

Pressure loss per unit length $\Delta p/L$ (units: Pa/m) is a function of:

ρ, the density of the fluid (kg/m³);

D, the hydraulic diameter of the pipe (m);

v, the mean flow velocity (m/s);

$f_D$, the Darcy friction factor (also called flow coefficient λ).

When the in-line inspection device 611 moves along the pipeline longitudinally, it measures the pressure values at different positions to verify the empirical equations and help to establish new pressure equation models.

The pressure-cycle data is used as a mechanism for predicting fatigue crack growth. Pressure data collected by in line inspection device 611 may also verify and revise such Operating-Pressure Cycle models below:

$$P_X = (P_1 + Kh_1 - P_2 - Kh_2)\left(\frac{L_2 - L_x}{L_2 - L_1}\right) - K(h_x - h_1) + P_2$$

Where the pressure, $P_X$, at any point between stations $P_1$=Pressure developed at upstream station during operation, psig $P_2$=Suction pressure at downstream station during operation, psig K=psi/foot of head $L_1$=Mile Post upstream, miles $L_2$=Mile Post downstream, miles $L_X$=Mile Post of Location X, miles $h_1$=Elevation of upstream, feet $h_2$=Elevation of downstream, feet $h_x$=Elevation of Location X, feet.

This method is used to determine the pressure cycles for chosen locations between pump stations.

Crack-growth models can be used to evaluate the effect of pressure-cycle-induced growth on the possibly remaining flaws in a pipeline. The rate of crack growth induced by the pressure-cycle spectrum is modeled using the Paris Law equation:

$$\frac{da}{dN} = C(\Delta K)^n$$

where

"a" is the crack depth,

"N" is the number of pressure cycles, $$\frac{da}{dN}$$

is the amount of crack growth (da) per cycle,

ΔK is the stress-intensity factor for a given pressure cycle.

The constant "C" and the exponent "n" characterize the rate of fatigue crack growth applicable to the particular material and environment of interest.

FIG. 1C illustrates the output data sets of intelligent integrated inspection regime 100. Intelligent Data Acquisition Device 111 carries a plurality of sensors configured to detect one or more of: radial displacement, pressure, temperature, flows, and acoustics to collect the data sets. So, as FIG. 5B illustrates, the Intelligent Data Acquisition 514 and pressure test 515 may establish adequate and high-accuracy continuous data profiles along the pipeline route, so that the sensitivity, effectiveness and reliability of RTTM/SCADA system 543 and leak detector 542 are improved significantly. The system can thus effectively improve the chance of leak prediction and detection and determine leak positions accurately, including tiny or pinhole leaking.

FIG. 7 illustrates a schematic block diagram of an embodiment of structure and workflow of the central processing unit 700 for the computational risk modeling system 400. A risk modeling machine 710 includes two supporting components called simulator 720 and failure mechanism learning machine 730.

Cluster Machine (finite state machine with clusters of events) is an 11-tuple structure for modeling risk dynamic systems of a pipeline. It defines three sets of transition functions (internal, external and confluent) and three clusters of risk events. The set of internal transition functions is classified as three subsets of functions: corrosion based, stress based, and pressure-defect based transition functions. Each risk event could be converted as corresponding sets of internal, external, or confluent transition functions as well as input variables and their values. Cluster Machine is different from 8-tuple DEVS structure, but it could be mapped to DEVS forms as a set of atomic and coupled models. Simulator 720 in FIG. 7 may be modeled under the formalism of either the Cluster Machine or DEVS.

Experimenting 721 may use the known set of internal transition functions to simulate possible risk and failure states. The results of Experimenting 721 are documented as incident cases and stored on failure incidents data server 703.

Many pressure-defect based transition functions have been proposed. The equation on bursting pressure for a defective pipe from ASME B31G is a model that may be applied in this risk modeling system:

$$p = \sigma \frac{2t}{D}[(1 - d/t)/(1 - M^{-1} \cdot d/t)]$$

p: bursting pressure for a defective pipe can withstand, MPa;

Where:

$M = \sqrt{1 + 0.6275(l/\sqrt{Dt})^2 - 0.003375(l/\sqrt{Dt})^4}$ when $(l/\sqrt{Dt})^2 \leq 50.0$ $M = 0.032(l/\sqrt{Dt})^2 + 3.3$ when $(l/\sqrt{Dt})^2 > 50.0$ σ=SMYS+68.95 MPa as the flow stress of the pipe, MPa;
D: pipe diameter, mm;
t: pipe wall thickness, mm;
d: Depth of defect, mm;
l: Length of defect, mm;
M: Bulging risk factor
SMYS: Specified Minimum Yield Stress The most well-known transition functions to compute remaining strength in hydrocarbon transmission pipelines are the ASME B31G and RSTRENG models:

ASME B31G Model:

$$p = \begin{cases} 1.11 \frac{2YSt}{D} \left( \frac{1 - \frac{2y}{3t}}{1 - \frac{2y}{3t}\frac{1}{M}} \right) \text{ for } \frac{L}{\sqrt{Dt}} \leq 4.479 \\ 1.11 \frac{2YSt}{D}\left(1 - \frac{y}{t}\right) \text{ for } \frac{L}{\sqrt{Dt}} \leq 4.479 \end{cases}$$

$$M = \sqrt{1 + 0.893 \frac{L}{Dt}}$$

RSTRENG Model:

$$p = \frac{2(YS + 68.95 MPa)t}{D}\left( \frac{1 - 0.85\frac{y}{t}}{1 - 0.85\frac{y}{t}\frac{1}{M}} \right)$$

$$M = \begin{cases} \sqrt{1 + 0.6275\frac{L^2}{Dt} - 0.003375\frac{L^2}{D^2 t^2}} \text{ for } L^2/Dt \leq 50 \\ 0.032\frac{L^2}{Dt} + 3.3 \text{ for } L^2/Dt > 50 \end{cases}$$

Where:
p is the failure pressure for pipes with active corrosion defects;
D: pipe diameter, mm;
t: pipe wall thickness, mm;
L: defect length;
y: defect depth;
YS: yield strength There are many more transition functions for modeling pipelines related to corrosions, cracking, and pressure-defect based transitions. A plurality of transition functions may be implemented and modeled in the simulator 720 with different cause events and variable values for experimenting 721, incorporating root event (cause) analysis of past incidents to generate more incidents and data cases.

Different from traditional risk modeling methodologies such as interacting threats matrix, fault tree model for interacting threats, Cluster Machine instantiates all risk-failure paths based states and event-drive transition functions. All possible paths could also be considered as a failure path tree, which could be denoted as a graph G:

$G = (V, E, \phi)$

V: a set of vertices (also called nodes or points);
E: a set of edges (also called links or lines);
φ: $E \rightarrow \{\{x, y\} | (x, y) \in V^2 \wedge x \neq y\}$ an incidence function mapping every edge to an ordered pair of vertices Failure path testing 722 in Simulator 720 enumerates and simulates all possible paths derived from Cluster Machine. This process also generates many useful results as incident cases with a large data set.

As the supporting component for risk modeling machine 710 and simulator 720, failure mechanism learning machine 730 learns event-driven state transition mechanisms and determines the transition functions denoted in the Cluster Machine. The failure mechanism learning machine 730 is based on the science of AI and learning which plays a key role in the fields of statistics, data mining and artificial intelligence. So it is a data mining and AI-based learning machine.

Data mining 731 is the process of discovering threat patterns and failure patterns from the huge data sets including GPS location and GIS spatial based pipeline characteristics, physical properties of the soils, operation data from different data sources and collection channels. The threshold for threat and pipeline failures associated with different risk events should be considered and determined. Data mining methods like Cluster analysis, Statistical classification, Association rule learning should be used to prepare training data sets for failure mechanism learning 732. The threat patterns and failure patterns recognized in Data mining 731 are grouped into different state subsets in the Cluster Machine.

Basically, by using multiple machine learning methods and AI models, the failure mechanism learning 732 learns event-driven state transition mechanisms and tries to determine transition functions from previous state to next state in the Cluster Machine. The learning process 732 is based on the training data set from Data mining 731, data set from failure incidents data server 703 and operation data sets from Operations Data Server 704.

As a part of artificial intelligence (AI), machine learning is a data science technique that allows computers to use existing data to predict future behaviors, outcomes, and trends. The predictions are based on learning processes and detecting patterns. Supervised learning including classification and regression could be used to learn a function that maps an input to an output based on training data sets. It is an approach for conditions with example input-output pairs that may be obtained from a historical data set. Unsupervised learning algorithms take a set of data that contains only inputs, and find structure in the data, like grouping or clustering of data points.

According to the report from "a model for predicting failure of oil pipelines", regression analysis and artificial neural networks (ANNs) models were developed based on historical data of pipeline accidents. The two models were able to satisfactorily predict pipeline failures due to mechanical, operational, corrosion, third party and natural hazards with an average validity of 90% for the regression model and 92% for the ANN model.

The article, "A survey on the application of Neural Networks in the safety assessment of oil and gas pipelines," by M. Lavouni (IEEE Symposium on Computational Intelligence for Engineering Solutions 2014, pp. 95-102) found that the use of neural networks in the area of pipeline safety has been quite extensive for predicting the probability of failure, the causes of failure, classification of metal defects, and detection and sizing of metal defects on a pipeline.

The bootstrap is a distribution-free inference method; its basic idea is to generate a sample from the observed data by sampling with replacement from the original data set. Using empirical models and re-sampling data sets from Experimenting 721, it can increase the accuracy of the bootstrapped regression models and ANN models.

Therefore, failure incidents and cases from researches and results generated in Experimenting 721 and Failure path testing 722 may be used in the failure mechanism learning machine 730 to learn event-driven state transition mechanisms and determine transition functions denoted in the Cluster Machine.

For each threat identified, risk modeling process 711 tries to build a risk model. In terms of the Cluster Machine, this process is basically to determine the possible failure path(s) with corresponding states and transition functions based on cases from the Failure Incidents Data Server 703. The failure mechanism learning machine 730 also supports this process by providing accurate transition functions based on the events or causes and input data set.

The model should be verified by the Verification process 723. Multiple available models could be compared in the threat risk modeling 711 based on the failure mechanism learning processes 732 in the Learning Machine 730.

The Validation process 724 runs the validity testing to verify that the model reflects a full range of scenarios and use cases. The testing may be multiple atomic or coupled simulations. The Prediction 712 is the output of the risk modeling 711 and Modeling Machine 710. The result may be a set of failure probabilities or risk scores for one or more failure mode state(s) ($S_f \in S$) in Cluster Machine.

Figure 8:
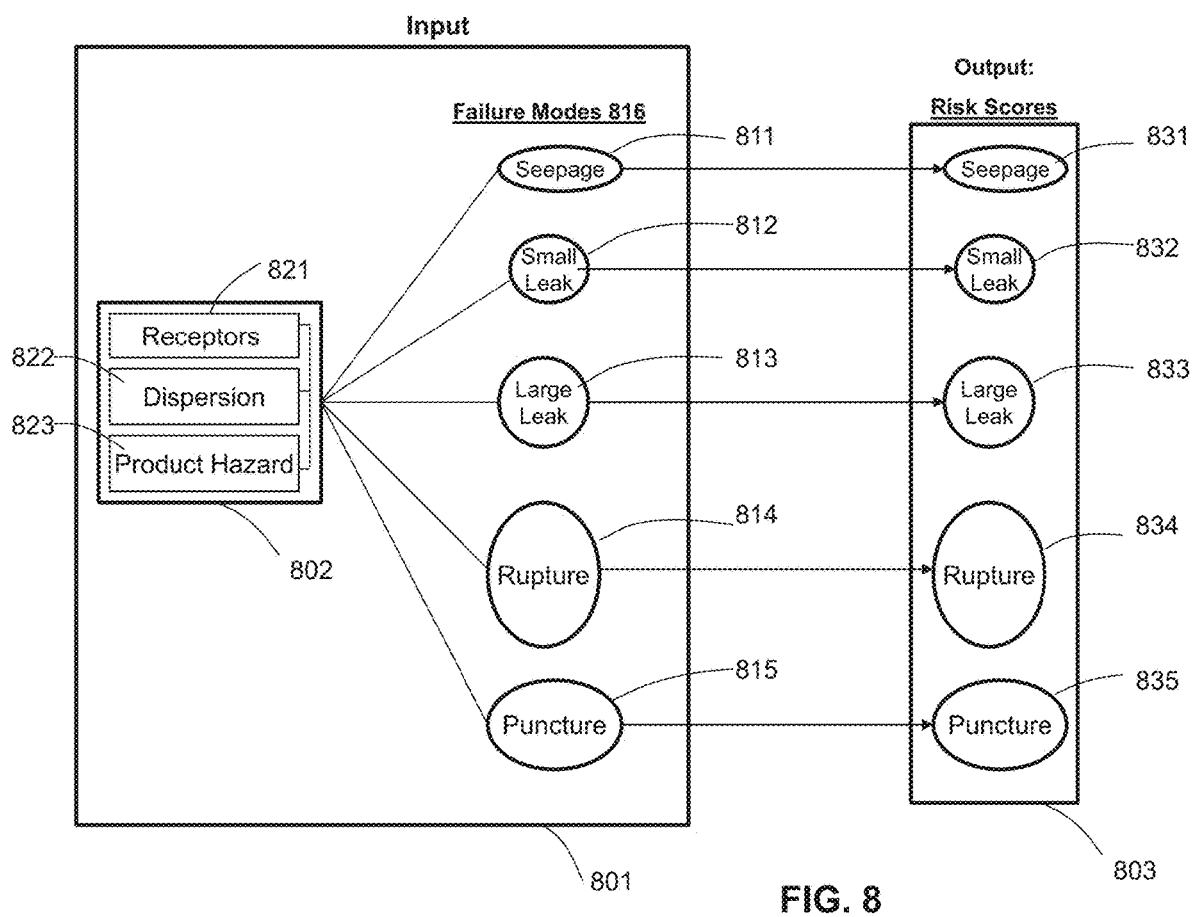
FIG. 8 illustrates a schematic block diagram of an embodiment of a framework for predicting consequences with risk severity levels.

FIG. 8 illustrates a schematic block diagram of an embodiment of a framework for predicting consequences with risk severity levels. There are two parts in the framework on computing the risk scores: input 801 and output 803. The input 801 includes consequence impact factors 802 and failure modes 816. The consequence impact factors 802 include Receptors 821, Dispersion factor 822 and Product Hazard 823 as the input to estimate the risk consequences based on the probabilities of failure modes Seepage 811, small leak 812, large leak 813, rupture 814, and puncture 815 which are from the output of Prediction 712 in FIG. 7.

The risk scores as the output of risk consequences in 803 are associated with risk severity levels: the consequences with Seepage 831 should be very light, but the consequences with Rupture 834 are far more severe than those associated with Small Leak 832, and Large Leak 833, as well as Puncture 835. All impact factors 802 may also be modularized in this risk modeling system with pre-defined index values and varied with the real situation.

The receptors 821 include factors like population density, environment considerations, high value areas etc. Dispersion factors 822 include weather, topography, surface flow resistance, volume released, emergency response, and product characteristics.

Product hazard 823 includes acute hazard characteristics and chronic hazard characteristics. Some product hazards 823 are almost purely acute in nature, such as natural gas. But both gaseous and liquid pipeline products should be assessed in terms of their flammability (Nf), reactivity (Nr), and toxicity (Nh). These are the acute hazards. Chronic hazard characteristics include aquatic toxicity, mammalian toxicity, environmental persistence, ignitability, corrosivity, and reactivity.

This multi-layered computational risk modeling framework with the failure mechanism learning machine is actually an open structure for all effective quantitative risk models. Both simulator and failure mechanism learning machine may implement different risk models for experimenting and learning and then validated and compared in the modeling machine. Moreover, it also keeps open to the new methodologies and algorithms of risk analysis and assessments.

In one or more aspects herein, a processing circuit or unit includes at least one processing device, such as a microprocessor, micro-controller, digital signal processor, microcomputer, neural network, AI processor, Quantum processor, field programmable gate array, programmable logic device, state machine, logic circuitry, analog circuitry, digital circuitry, and/or any device that manipulates signals (analog and/or digital) based on hard coding of the circuitry and/or operational instructions. A memory device as used herein is a non-transitory memory and may be an internal memory or an external memory, and the memory may be a single memory device or a plurality of memory devices. The memory may be a read-only memory, random access memory, and/or any non-transitory memory device that stores information. In general, a processing circuit, unit or device is configured to perform one or more of the functions described herein in response to instructions stored in a memory device.

As may be used herein, the term "operable to" or "configurable to" indicates that an element includes one or more of circuits, instructions, modules, data, input(s), output(s), etc., to perform one or more of the described or necessary corresponding functions and may further include inferred coupling to one or more other items to perform the described or necessary corresponding functions. As may also be used herein, the term(s) "coupled", "coupled to", "connected to" and/or "connecting" or "interconnecting" includes direct connection or link between nodes/devices and/or indirect connection between nodes/devices via an intervening item (e.g., an item includes, but is not limited to, a component, an element, a circuit, a module, a node, device, network element, etc.). As may further be used herein, inferred connections (i.e., where one element is connected to another element by inference) includes direct and indirect connection between two items in the same manner as "connected to".

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, frequencies, wavelengths, component values, integrated circuit process variations, temperature variations, rise and fall times, and/or thermal noise. Such relativity between items ranges from a difference of a few percent to magnitude differences.

As used herein, the terms "comprise," "comprises," "comprising," "having," "including," "includes" or any variation thereof, are intended to reference a nonexclusive inclusion, such that a process, method, article, composition or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

Moreover, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is intended to be construed under the provisions of 35 U.S.C. § 112(f) as a "means-plus-function" type element, unless the element is expressly recited using the phrase "means for" or, in the case of a method claim, the element is recited using the phrase "step for."

The various features of the disclosure described herein can be implemented in different systems and devices without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

In the foregoing specification, certain representative aspects have been described with reference to specific examples. Various modifications and changes may be made, however, without departing from the scope of the claims. The specification and figures are illustrative, rather than restrictive, and modifications are intended to be included within the scope of the claims. Accordingly, the scope of the claims should be determined by the claims themselves and their legal equivalents rather than by merely the examples described. For example, the components and/or elements recited in any apparatus claims may be assembled or otherwise operationally configured in a variety of permutations and are accordingly not limited to the specific configuration recited in the claims.

Furthermore, certain benefits, other advantages and solutions to problems have been described above with regard to particular embodiments; however, any benefit, advantage, solution to a problem, or any element that may cause any particular benefit, advantage, or solution to occur or to become more pronounced are not to be construed as critical, required, or essential features or components of any or all the claims.

The invention claimed is:

1. A system for operational and integrity management of a pipeline, comprising:
    an inspection subsystem configured to obtain inline data relating to enclosed portions of the pipeline and geo-data associated with the inline data;
    an operational subsystem with a plurality of sensors at targeted positions in the pipeline, wherein the operational system obtains field data measured at the targeted positions in the pipeline;
    a data processing subsystem configured to perform data mining on at least the field data and the inline data for a portion under inspection of the pipeline and generate input data for at least the portion under inspection of the pipeline; and
    a risk modeling subsystem configured to:
        perform risk modeling of the pipeline by processing the input data using a Cluster Machine type processing model that defines a plurality of sets of transition functions between a plurality of initial states and a plurality of failure mode states, wherein the plurality of sets of transition functions include one or more functions determined using one or more machine learning techniques with a known data input for a known failure mode state; and
        generate a risk score for at least one of a plurality of failure mode states for the portion of the pipeline under inspection.

2. The system of claim 1, wherein the risk modeling subsystem further comprises:
    at least one memory device including a non-transitory memory for storing the field data obtained from the operational subsystem and the inline data obtained from the inspection subsystem;
    at least one processing device configured to:
        perform data processing on the in-line data and field data to generate input for risk modeling;
        perform risk modeling of the pipeline by processing the input data using the Cluster Machine type processing model to generate the risk score for at least one of the plurality of failure mode states for the portion of the pipeline under inspection; and
        initiate risk monitoring for the portion of the pipeline under inspection by the operational subsystem and the inspection subsystem.

3. The system of claim 1, wherein the plurality of failure mode states comprises at least: seepage, small leak, large leak, rupture and puncture.

4. The system of claim 3, wherein the plurality of initial states comprises at least: normal, girth weld, welding and bend/buckle.

5. The system of claim 4, wherein the plurality of transition states comprises at least: corroded, cracked, dented, defected, and deformed.

6. The system of claim 5, wherein the plurality of sets of transition functions comprises a set of internal transition functions having at least three subsets of functions, wherein the at least three subsets of functions includes: corrosion based transition functions, stress based transition functions, and pressure-defect based transition functions.

7. The system of claim 6, wherein the at least one processing device is configured to perform the risk modeling of the pipeline by:
    processing the input data using the Cluster Machine type processing model to simulate and determine at least one possible failure path, wherein the at least one failure path starts from one of the plurality of initial states to one or more transition states and then to one of the plurality of failure mode states.

8. The system of claim 7, wherein the at least one processing device is configured to perform the risk modeling of the pipeline by:
    processing the input data using the Cluster Machine type processing model to determine a plurality of possible failure paths by adding alternative failure paths to at least one memory device and form a library of a plurality of Failure Path Trees, wherein each Failure Path Tree is denoted as a computational graph below:

$G=(V,E,\phi)$, wherein

V is a set of vertices for states;
E is a set of edges among states; and

φ is a function (E→{{x, y}|(x, y)∈V² ∧x≠y}) for mapping edges to an ordered pair of vertices.

9. The system of claim 1, wherein the at least one processing device is configured to perform the risk modeling of the pipeline by:
performing validation testing of the Cluster Machine type processing model using multiple atomic or coupled simulations.

10. The system of claim 1, wherein the inspection subsystem comprises:
an inline inspection vehicle configured to propagate through enclosed portions of the pipeline between the targeted positions, wherein the in-line inspection vehicle generates the inline data relating to the enclosed portions of the pipeline; and
a companion device external to the pipeline, wherein the companion device is configured to track a position of the inline inspection vehicle in the enclosed portions of the pipeline and generate geo-data associated with the position of the inline inspection vehicle in the enclosed portions of the pipeline.

11. The system of claim 10, wherein the data processing subsystem comprises:
at least one data processing device configured to:
map the inline data from the inline inspection vehicle to at least the portion under inspection of the pipeline using the generated geo-data associated with the position of the inline inspection vehicle; and
determine the field data for the portion under inspection of the pipeline.

12. A system for operational and integrity management of a pipeline, comprising:
an operational subsystem with a plurality of sensors at targeted positions in the pipeline, wherein the operational system obtains field data measured at the targeted positions in the pipeline;
a data processing subsystem configured to perform data mining on at least the field data for a portion under inspection of the pipeline and generate input data for at least the portion under inspection of the pipeline; and
a risk modeling subsystem configured to:
perform risk modeling of the pipeline by processing the input data using a Cluster Machine type processing model that defines a plurality of sets of transition functions between a plurality of initial states and a plurality of failure mode states, wherein the plurality of sets of transition functions include one or more functions determined using one or more machine learning techniques with a known data input for a known failure mode state; and
generate a risk score for at least one of a plurality of failure mode states for the portion of the pipeline under inspection.

13. The system of claim 12, wherein the risk modeling subsystem further comprises:
at least one memory device including a non-transitory memory for storing the field data obtained from the operational subsystem; and
at least one processing device configured to initiate risk monitoring for the portion of the pipeline under inspection.

14. The system of claim 12, wherein the plurality of failure mode states comprises at least: seepage, small leak, large leak, rupture and puncture.

15. The system of claim 14, wherein the plurality of initial states comprises at least: normal, girth weld, welding and bend/buckle.

16. The system of claim 15, wherein the plurality of transition states comprises at least: corroded, cracked, dented, defected, and deformed.

17. The system of claim 16, wherein the plurality of sets of transition functions comprises a set of internal transition functions having at least three subsets of functions, wherein the at least three subsets of functions includes: corrosion based transition functions, stress based transition functions, and pressure-defect based transition functions.

18. The system of claim 17, wherein the at least one processing device is configured to perform the risk modeling of the pipeline by:
processing the input data using the Cluster Machine type processing model to simulate and determine at least one possible failure path, wherein the at least one failure path starts from one of the plurality of initial states to one or more transition states and then to one of the plurality of failure mode states.

19. The system of claim 12, further comprising an inspection subsystem, wherein the inspection subsystem comprises:
an inline inspection vehicle configured to propagate through enclosed portions of the pipeline, wherein the inline inspection vehicle obtains inline data relating to the enclosed portions of the pipeline; and
a companion device configured to move externally to the pipeline and track the inline inspection vehicle, wherein the companion device is configured to detect a position of the inline inspection vehicle in the enclosed portions of the pipeline and generate geo-data associated with the position of the inline inspection vehicle.

20. The system of claim 19, wherein the risk modeling subsystem is configured to:
map the inline data from the inline inspection vehicle to a portion under inspection of the pipeline using the geo-data associated with the position of the inline inspection vehicle to generate an inline data set for the portion under inspection of the pipeline; and
generate input data using the inline data set and the field data for the portion under inspection of the pipeline.

* * * * *